(12) United States Patent
Zamir et al.

(10) Patent No.: US 7,191,223 B1
(45) Date of Patent: Mar. 13, 2007

(54) SYSTEM AND METHOD FOR REAL-TIME ALERTS

(75) Inventors: Oren Zamir, Ramat-Hasharon (IL); Guy Windreich, Rishon Lezion (IL); Edo Segal, Los Angeles, CA (US)

(73) Assignee: The Relegence Corporation, New York, NY (US)

( * ) Notice: Subject to any disclaimer, the term of this patent is extended or adjusted under 35 U.S.C. 154(b) by 1253 days.

(21) Appl. No.: 09/654,801

(22) Filed: Sep. 5, 2000

Related U.S. Application Data

(63) Continuation-in-part of application No. 09/481,206, filed on Jan. 11, 2000.

(51) Int. Cl.
*G06F 15/16* (2006.01)
*G06F 15/173* (2006.01)

(52) U.S. Cl. .................................. 709/207; 709/224

(58) Field of Classification Search ................ 709/218, 709/219, 201, 202, 203, 204, 206, 207; 707/6
See application file for complete search history.

(56) References Cited

U.S. PATENT DOCUMENTS

| | | | |
|---|---|---|---|
| 5,724,424 A | 3/1998 | Gifford | |
| 5,886,746 A | 3/1999 | Yuen et al. | |
| 5,970,206 A | 10/1999 | Yuen et al. | |
| 6,052,145 A | 4/2000 | Macrae et al. | |
| 6,091,882 A | 7/2000 | Yuen et al. | |
| 6,101,493 A | 8/2000 | Marshall et al. | |
| 6,269,368 B1 * | 7/2001 | Diamond | 707/6 |
| 6,381,594 B1 * | 4/2002 | Eichstaedt et al. | 709/219 |
| 6,574,632 B2 * | 6/2003 | Fox et al. | 709/218 |

OTHER PUBLICATIONS

Co-pending U.S. Appl. No. 09/618,656 entitled: "Apparatus and Method for Dynamic Advertisment", filed Jul. 18, 2000.
Co-pending U.S. Appl. No. 09/655,185 entitled: "System and Method for Real-Time Searching", filed Sep. 5, 2000.
Co-pending U.S. Appl. No. 09/654,634 entitled: "Media Monitor Page and Method for Creating the Same", filed Sep. 5, 2000.
Co-pending U.S. Appl. No. 09/654,822 entitled: "Media Monitor System", filed Sep. 5, 2000.

* cited by examiner

*Primary Examiner*—Paul H. Kang
(74) *Attorney, Agent, or Firm*—Seth D. Levy; Davis Wright Tremaine LLP

(57) ABSTRACT

A system and method for real time alert, adapted to receive information streams, to analyze the content of said stream in real time and to generate an alert. Said system and method allow to provide real time alerts based upon an analysis of a reception of information packets generated from a plurality of information sourced during a predetermined period of time.

150 Claims, 6 Drawing Sheets

ALERT MODULE

ALERT MODULE

THE ALERT INDEX

SYSTEM AND METHOD FOR REAL-TIME ALERTS

RELATED APPLICATIONS

This application claims the benefit of U.S. Provisional Apllication No. 60/180,660, filed Jan. 7, 2000.

FIELD OF THE INVENTION

The present invention generally relates to real time alerts and, in particular, to a system for allowing to implement complex matching techniques in real time on live dynamic content.

BACKGROUND OF THE INVENTION

Information streams are generated by a plurality of information sources, such as television broadcasters, radio broadcasters, news wires, internet sites.

Prior art alert systems are not adapted to handle real time generated content, and especially are not able to implement complex matching techniques in real time.

There is an urgent need for a system and method for real time alert that is fast, accurate, scalable without significant loss of performance and can be maintained to be significantly current in real-time. Especially there is a need to provide such a real time alert system and method that is further adapted to perform a complex alert match in real time.

BRIEF DESCRIPTION OF THE DRAWINGS

The present disclosure will be understood and appreciated more fully from the following detailed description taken in conjunction with the drawings in which.

DETAILED DESCRIPTION OF THE PREFERRED EMBODIMENT

Figure 1:
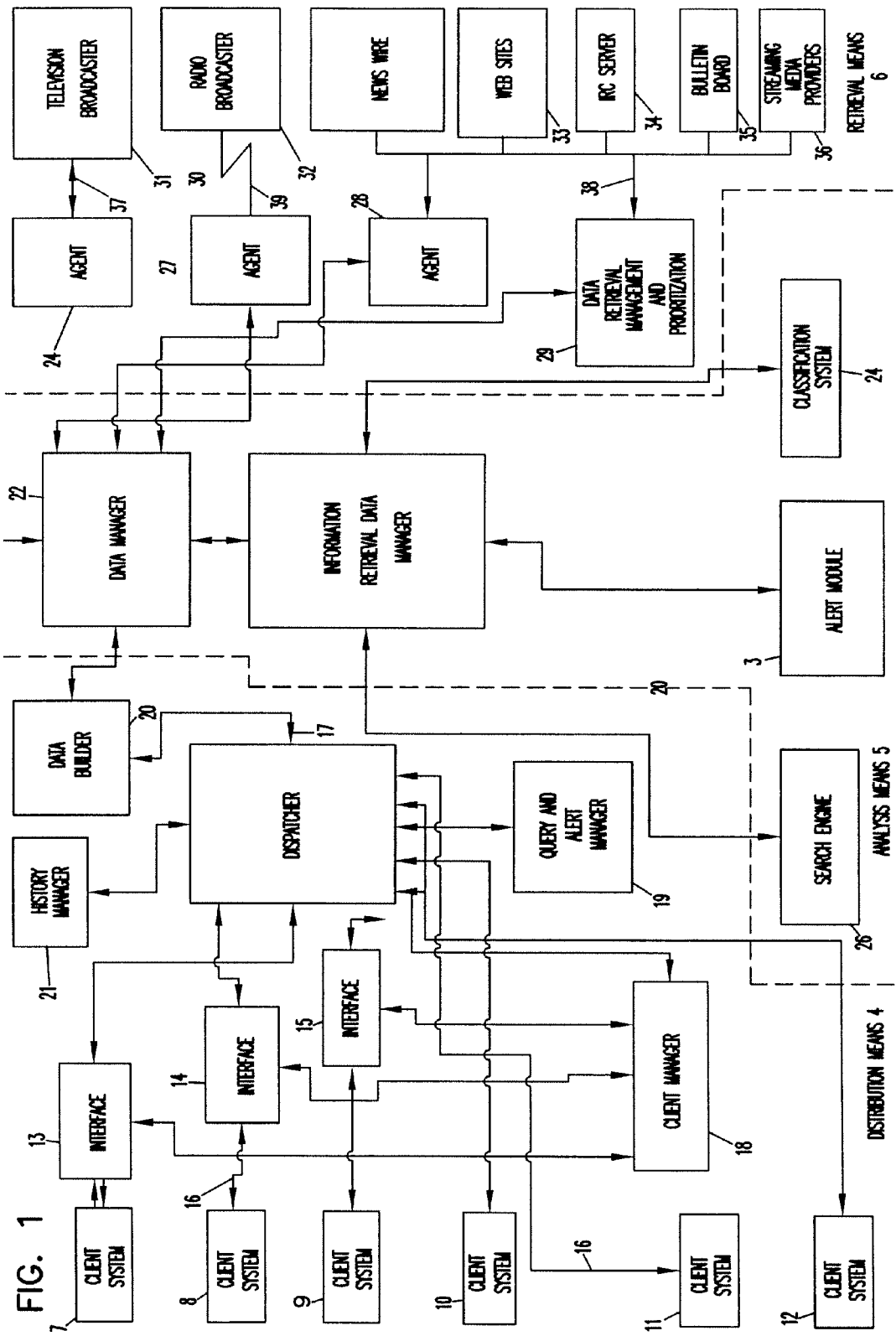
FIG. 1 is a simplified illustration of the environment in which the alert engine is operating, in accordance with a preferred embodiment of the present disclosure.

It should be noted that the particular terms and expressions employed and the particular structural and operational details disclosed in the detailed description and accompanying drawings are for illustrative purposes only and are not intended to in any way limit the scope of the invention as described in the appended claims.

The invention provides a fast, accurate, scalable without significant loss of performance method for real time alert that is maintained to be significantly current in real-time.

The invention provides a method for real time alert, said method comprising the steps of: (A) receiving an information packet; said information packets either provided by an information source or representative of a portion of a received signal provided by an information source; (B) extracting at least one extracted term out of the information packet; (C) determining whether an extracted term out of said at least one extracted term matches an alert term, and accordingly updating a matching term information representative of a reception of matching extracted terms, an alert criteria comprising of at least one alert term, said matching term information being stored in a storage means that is configured to allow fast insertion and fast deletion of content; (D) processing a at least a portion of the matching extracted term information to determine whether to issue an alert; and (E) issuing at least one alert to at least one client system, according to said determination. Conveniently, the matching term information representative of a reception of matching extracted terms during a predetermined period of time.

The invention provides a method for real time alert wherein the portion of the matching extracted term information that is being processed is determined by an alert criteria.

The invention provides a real time alert system wherein said alert criteria comprising of the matching extracted term received and processed in previous steps (A)–(C).

The invention provides a method for real time alert method wherein an alert criteria comprising at least one alert term, a relationship between alert terms of each alert criteria. For example, when implementing Boolea matching techniques, Boolean operators such as 'AND', 'OR' or 'NOT' define a relationship between at least two alert terms of a single alert criteria.

The invention provides a method for real time alert wherein an alert criteria further comprising a field selected from a group consisting of: a similarity threshold, an alert term weighting factor and a client system identifier.

The invention provides a method for real time alert, said method further comprising the steps of: storing the information packet and related control data in the storage means; and linking between the stored information packet and the matching extracted term information.

The invention provides a method for real time alert, said method comprising the steps of: receiving an information stream, said information stream either provided by an information source or representative of a portion of a received signal provided by an information source; generating a plurality of information packets from said information stream; extracting at least one extracted term out of the information packet; determining whether an extracted term out of said at least one extracted term matches an alert term, and accordingly updating a matching term information representative of a reception of matching extracted terms, an alert criteria comprising of at least one alert term; processing an alert criteria and at least a portion of the matching extracted term information to determine whether to issue an alert; and issuing at least one alert to at least one client system, according to said determination.

The invention provides a method for real time alert, said method further comprising the steps of: storing an information packet and related control data in a storage means; and linking between the stored information packet and the matching extracted term information.

The invention provides a method for real time alert, said method comprising the steps of: receiving an information packet, said information packet either provided by an information source or representative of a portion of a received signal provided by an information source; extracting at least one extracted term out of the information packet; determining whether an extracted term out of said at least one extracted term matches an alert term, and accordingly updating a matching term information representative of a reception of matching extracted terms, an alert criteria comprising of at least one alert term; processing at least portion of the matching extracted term information to determine whether to issue an alert; said portion representative of a reception of at least one matching information from a single information source; and issuing at least one alert to at least one client system, according to said determination.

The invention provides a method for real time alert, said method comprising the steps of: receiving an information stream, said information stream either provided by an information source or representative of a portion of a received signal provided by an information source; determining whether the information stream comprising of information packets and if the information stream is not comprised of information packets then generating a plurality of information packets from said information stream; extracting at least one extracted term out of the information packet; determining whether an extracted term out of said at least one extracted term matches an alert term, and accordingly updating a matching term information representative of a reception of matching extracted terms, an alert criteria comprising of at least one alert term; processing at least a portion of the matching extracted term information to determine whether to issue an alert; and issuing at least one alert to at least one client system, according to said determination.

The invention provides a method for real time alert wherein the portion of the matching extracted term information that is being processed is determined by an alert criteria.

The invention provides a real time alert system wherein said alert criteria comprising of the matching extracted term received and processed in previous steps.

The invention provides a method for real time alert wherein the step of processing is preceded by at least one preprocessing step selected from a group consisting of: adding control data to said information packet; filtering the information packet; processing an extracted term by adding control information to said extracted term; and filtering the extracted term, wherein said filtered extracted terms are matched against alert terms. The extracted term is extracted out of an information packet by parsing and stemming the information packet; and wherein the step of filtering further comprising a step selected from a group consisting of: (a) discarding a term constructed of one-letter word; (b) discarding a term constructed of a frequently used word; (c) discarding said term constructed of stop-word; and (d) discarding said term constructed of predefined word.

The invention provides a method for real time alert wherein alert terms and associated matching extracted term information are stored in an alert terms hash, and wherein the linked information packets are stored in a message hash.

The invention provides a method for real time alert wherein the matching extracted term information comprising of at least one information field selected from a group consisting of: a last modification time field, indicating a most recent time of reception of the matching extracted term, during a predetermine period of time; a number of channels containing term, indicating a number of information sources that provided the matching extracted term during a predetermine period of time; a total instances field, indicating a total amount of receptions of the matching extracted term during a predetermine period of time; and a terms inverted entries map, comprising of a plurality of matching terms inverted file entries, each entry holding information representative of a reception of the matching extracted term from a single information source during a predetermine period of time.

The invention provides a method for real time alert wherein each matching term inverted file entry comprising of at least one field selected from a group consisting of: a channel identifier, for identifying the information source that provided the matching extracted term during a predetermine period of time; instances number, for indicating a total amount of receptions of the matching extracted term from an information source during a predetermine period of time; and time of last appearance, for indicating a most recent time of reception of the matching extracted term from an information source during a predetermine period of time.

The invention provides a method for real time alert wherein each information packet is further associated to a message terms key map, said message key map comprising of a plurality of message characteristic entries, each message characteristic entry associated to a matching extracted term being extracted from the information packet, said message characteristic entry comprising of at least one of the following fields selected from a group consisting of: a term inverted file, for pointing to the matching extracted term information; an instance of number, for indicating a number of time said matching extracted term appeared in the information packet; and an inverted file entry, for pointing to a terms inverted file entry.

The invention provides a method for real time alert wherein a step of deleting an information packet further comprises of the steps of: receiving an information packet identification, whereas matching extracted term information representative of a reception of matching terms extracted from the information packets is to be deleted; reading the information packet identification from the messages hash table; obtaining relevant entries of said matching extracted terms belonging to said information packet; and accessing said matching extracted terms inverted file for each said matching extracted terms entry pointed to said terms inverted file.

The invention provides a method for real time alert wherein the step of deleting further comprising a step of decreasing a value of said total instances by a value of said instances number for each said matching extracted terms entry pointed to said terms inverted file.

The invention provides a method for real time alert wherein the step of deleting further comprising a step of deleting an extracted term by a garbage collection process and canceling a link between said term in said terms hash table and said terms inverted file.

The invention provides a method for real time alert wherein an information source is selected from a group consisting of: data network providers, chat channels providers, news providers, and music providers. The information packets comprise of content selected from a group of: text, audio, video, multimedia, and executable code streaming media.

The invention provides a method for real time alert wherein the step of processing comprising a step of fetching each alert criteria that have an alert term that matches a matching extracted term that was previously received. A step of checking each alert criteria to determine which portion of matching terms extracted information to fetch. A step of fetching said portion and a step of processing said portion, in light of the alert criteria to determine whether to issue an alert.

The invention provides a method for real time alert wherein the step of processing said portion is based upon a parameter out of a group consisting of: a total amount of extracted terms provided by an information source in a predefined time interval; an elapsed time since the extracted term was provided by the information source in said predefined time interval; and an extracted term position in the information source.

The invention provides a method for real time alert wherein the step of processing said portion involves computing a similarity between an alert criteria and information indicating a reception of a group of information packets. The similarity reflects at least one of the following parameters: a total amounts of extracted terms being received from at least one information source during a predefined time interval; a number of matching extracted terms being received from at least one information source during the predefined time interval; a total number of information sources being searched during the predefined time interval; an elapsed time since a last appearance of a matching extracted term from an information source during the predefined time interval; a position of matching extracted terms in at least one information source; an extracted term in proximity to a matching extracted term; a part of speech of a matching extracted term; and a matching extracted term frequency and importance in a language of the information source. Said similarity can be compared to a predefined similarity threshold, in order to determine whether to send an alert to a client system. Preferably, the group of at least one information packet comprising of at least one information packet received from a single information source.

The invention provides a method for real time alert, implementing a matching technique selected from a group consisting of: Boolean based matching; probabilistic matching; fuzzy matching; proximity matching; and vector based matching.

The invention provides a method for real time alert implementing complex matching techniques.

The invention provides a method for real time alert wherein the step of issuing an alert further comprising a step of determining to which client system to send an alert.

The invention provides a method for real time alert wherein the step of issuing an alert further comprising the steps of: determining a format of an alert to be sent to a client system, according to a predefined client system format; and formatting the alert according to said client system format.

The invention provides a method for real time alert wherein the predetermined client format selected from a group consisting of: HTML format; WAP format; PDA compatible format; Digital television compatible format; electronic mail format; and multimedia stream format.

The invention provides a method for real time alert wherein an alert comprising of at least one field selected from a group consisting of: an information source identifier field, for identifying an information source that either provided a matching extracted packet or for identifying an information source that provided a received signal, whereas a portion of said received signal being represented in an information packet from which the extracted term was extracted; a link field, for allowing the client system to be linked to the information source or for allowing the client system to receive additional information from said information source; and an information source category identification, identifying a category of information source that provided the matching extracted term.

The invention provides a method for real time alert wherein the additional information is selected from a group consisting of: a multimedia stream originated by said information source; a stream of information packets originated by said information source; a multimedia stream associated to the information packet from which the extracted term was extracted; a stream of information packets, comprising the extracted term.

The invention provides a method for real time alert wherein a client system is configured to generate a unique information source category indication and in response to a reception of said information source category identification and to generate a unique information source indication and in response to a reception of said information source identification.

The invention provides a method for real time alert, said method comprising the steps of: receiving an information packet; said information packets either provided by an information source or representative of a portion of a received signal provided by an information source; extracting at least one extracted term out of the information packet; determining whether an extracted term out of said at least one extracted term matches an alert term, and accordingly updating a matching extracted term information representative of a reception of matching extracted terms during a predetermined period of time, an alert criteria comprising of at least one alert term; processing at least a portion of the matching extracted term information to determine whether to issue an alert; and issuing at least one alert to at least one client system, according to said determination.

The invention provides a method for real time alert wherein the portion of the matching extracted term information that is being processed is determined by an alert criteria.

The invention provides a real time alert system wherein said alert criteria comprising of the matching extracted term received and processed in previous steps.

The invention provides a method for real time alert, said method comprising the steps of: receiving an information packet; said information packets either provided by an information source or representative of a portion of a received signal provided by an information source; extracting at least one extracted term out of the information packet; determining whether an extracted term out of said at least one extracted term matches an alert term, and accordingly updating a matching extracted term information representative of a reception of matching extracted terms, an alert criteria comprising of at least one alert term; processing at least a portion of the matching extracted term information to determine whether to issue an alert, in response to a reception of a matching extracted term; and issuing at least one alert to at least one client system, according to said determination.

The invention provides a method for real time alert wherein the portion of the matching extracted term information that is being processed is determined by an alert criteria.

The invention provides a real time alert system wherein said alert criteria comprising of the matching extracted term received and processed in previous steps.

The invention provides a system for real time alert, said system comprising of: (A) an information packet processor, for receiving an information packet; and extracting at least one extracted term out of the information packet; said information packets either provided by an information source or representative of a portion of a received signal provided by an information source; (B) a storage means, configured to allow fast insertion and fast deletion of content, for storing matching term information representative of a reception of matching extracted terms, an alert criteria comprising of at least one alert term; (C) a storage means controller, coupled to the information packet processor and to the storage means, for receiving the at least one extracted term, for determining whether an extracted term out of said at least one extracted term matches an alert term, and accordingly for updating the matching term information; and (D) an alert module, coupled to the storage means, for processing at least a portion of the matching extracted term information to determine whether to issue an alert; and for issuing at least one alert to at least one client system, according to said determination.

The invention provides a system for real time alert wherein the portion of the matching extracted term information that is being processed is determined by an alert criteria.

The invention provides a real time alert system wherein said alert criteria comprising of the matching extracted term previously received and processed.

The invention provides a real time alert system wherein said alert criteria are stored in the storage means or in an additional storage means.

The invention provides a real time system wherein the matching term information representative of a reception of matching extracted terms during a predetermined period of time. The storage means controller further adapted to store the information packet and related control data in the storage means, and to link between the stored information packet and the matching extracted term information. The storage means holds a term index data structure.

The invention provides a real time alert system wherein the information packet processor is further adapted to perform at least one preprocessing step selected from a group consisting of: adding control data to said information packet; filtering the information packet; processing an extracted term by adding control information to said extracted term; and filtering the extracted term, wherein said filtered extracted terms are matched against alert terms. The information packet processor is configured to extract an extracted term from an information packet by parsing and stemming the information packet. The storage means controller is adapted to delete information packets from the storage means, after a predetermined period has lapsed; and wherein a deletion of an information packet is followed by a deletion of the linked extracted term information.

The invention provides a system for real time alert, wherein the storage means controller is further adapted to determine a deletion of an information packet and associated matching extracted term information. The storage means controller is adapted access the message hash table, to obtain relevant entries of said matching extracted terms belonging to said information packet; and access said matching extracted terms inverted file for each said matching extracted terms entry pointed to said terms inverted file.

The invention provides a system for real time alert wherein the alert module is adapted to rank information sources according to a similarity between at least a portion of information packets provided by said information sources and between an alert criteria. Said rank is based upon a parameter out of a group consisting of: a total amount of extracted terms provided by an information source in a predefined time interval; an elapsed time since the extracted term was provided by the information source in said predefined time interval; and an extracted term position in the information source.

The invention provides a system for real time alert that is adapted to compute a similarity between an alert criteria and information indicating a reception of a group of at least one matching information packet. The group of at least one information packet comprising of at least one information packet received from a single information source. The similarity reflects at least one of the following parameters: a total amounts of extracted terms being received from at least one information source during a predefined time interval; a number of matching extracted terms being received from at least one information source during the predefined time interval; a total number of information sources being searched during the predefined time interval; an elapsed time since a last appearance of a matching extracted term from an information source during the predefined time interval; a position of matching extracted terms in at least one information source; an extracted term in proximity to a matching extracted term; a part of speech of a matching extracted term; and a matching extracted term frequency and importance in a language of the information source.

The invention provides a system for real time alert wherein the alert module further adapted to implement a matching technique selected from a group consisting of: Boolean based matching; probabilistic matching; fuzzy matching; proximity matching; and vector based matching.

The invention provides a system for real time alert wherein the alert module further adapted to implement complex matching techniques.

The invention provides a system for real time alert wherein the alert module further adapted to determine to which client system to send an alert. The alert module further adapted to determine a format of an alert to be sent to a client system, according to a predefined client system format and to formatting the alert according to said client system format. Said predetermined client format selected from a group consisting of: HTML format; WAP format; PDA compatible format; Digital television compatible format; electronic mail format; and multimedia stream format. An alert comprising of at least one field selected from a group consisting of: an information source identifier field, for identifying an information source that either provided a matching extracted packet or for identifying an information source that provided a received signal, whereas a portion of said received signal being represented in an information packet from which the extracted term was extracted; a link field, for allowing the client system to be linked to the information source or for allowing the client system to receive additional information from said information source; and an information source category identification, identifying a category of information source that provided the matching extracted term. The additional information is selected from a group consisting of: a multimedia stream originated by said information source; a stream of information packets originated by said information source; a multimedia stream associated to the information packet from which the extracted term was extracted; a stream of information packets, comprising the extracted term.

The invention provides a system for real time alert coupled to a plurality of client systems, wherein a client system is configured to generate a unique information source category indication and in response to a reception of said information source category identification and to generate a unique information source indication and in response to a reception of said information source identification.

The invention provides a system for real time alert further comprising at least one module selected from a group of modules consisting of: a message coordinator module adapted to coordinate an handling of a plurality of information packets; a message buffer adapted to hold temporarily the plurality of information packets; a message filter module for filtering the plurality of information packets according to predefined rules; a term extractor module for performing parsing and stemming on said plurality of information packets; a terms filter for excluding extracted terms according to predefined rules; a queries coordinator module to coordinate the processing of alert criteria; a query-term extractor to parse and stem incoming alert criteria in order to extract and process operative alert terms; and an alert terms filter for excluding specific alert terms in a predefined manner.

The invention provides a system for real time alert wherein the storage means holds a term index data structure, said term index data structure further comprising: an alert terms hash table to hold alert terms; a matching extracted terms inverted file pointed to by said alert term hash table holding a matching extracted terms inverted entry map; a messages hash table to hold information packets identification; a messages data table to hold information packets data; and a channel map to hold a list of information sources and the related number of index terms of said information source.

The invention provides a system for real time alert wherein the terms inverted file further comprising: a matching extracted terms inverted entries map table; a total instances of said matching extracted term; a number of information sources containing said matching extracted term; and a last modification time of said matching extracted term.

The invention provides a system for real time alert further comprising: a message terms keyed map; an information source identification; and an information packet time of arrival.

The invention provides a system for real time alert wherein the message terms keyed map further comprising: a pointer to said matching extracted terms inverted file; an instances number of said matching extracted term in said information packet; and a pointer to said inverted file entry related to said matching extracted term.

The invention provides a system for real time alert wherein the matching extracted terms inverted entries map further comprising; an information source identification; an instances number of said matching extracted term in said information source informational content; and a time of last appearance of said matching extracted term in said information source informational content.

The invention provides a system for real time alert wherein the storage means further allows timely deletions of irrelevant or time-decayed terms and query-terms.

The invention provides a system for real time alert, said system comprising of: an information packet processor, for receiving an information packet; and extracting at least one extracted term out of the information packet; said information packets either provided by an information source or representative of a portion of a received signal provided by an information source; a storage means, for storing matching term information representative of a reception of matching extracted terms, an alert criteria comprising of at least one alert term; a storage means controller, coupled to the information packet processor and to the storage means, for receiving the at least one extracted term, for determining whether an extracted term out of said at least one extracted term matches an alert term, and accordingly for updating the matching term information; and an alert module, coupled to the storage means, for processing at least a portion of the matching extracted term information to determine whether to issue an alert; and for issuing at least one alert to at least one client system, according to said determination.

The invention provides an real time alert system whereas the information packet processor comprising of at least one module selected from a group of modules consisting of: a message coordinator module adapted to coordinate an handling of a plurality of information packets; a message filter module for filtering the plurality of information packets according to predefined rules; a term extractor module for performing parsing and stemming on said plurality of information packets; and a terms filter for excluding extracted terms according to predefined rules.

The invention provides an real time alert system further comprising an alert criteria module, coupled to the storage means, to the storage means controller and to a plurality of client systems, for handling client system requests form updating alert criteria.

The invention provides an real time alert system whereas the alert criteria module comprising of at least one module selected from a group consisting of: an alert criteria coordinator module to coordinate the processing of alert criteria; an alert term extractor to parse and stem incoming alert criteria in order to extract and process operative alert terms; and an alert terms filter for excluding specific alert terms in a predefined manner.

Referring to FIG. 1 describing system 1 in which real time search engine 26 and real time alert module 3 operate, according to a preferred embodiment of the invention. System 1 comprising of distribution means 4, analysis means 5 and retrieval means 6.

Client systems 7, 8, 9, 10, 11 and 12 provide client queries and/or alert criteria to system 1. Client systems are coupled to system 1 via network 16 and a plurality of interfaces, such as interfaces 13, 14 and 15. For convenience of explanation it is assumed that client system 7 is a personal computer system, client system 8 is a cellular phone, client system 9 is a PDA, client system 10 is a set top box coupled to a digital television, client system 11 is adapted to receive electronic mail.

Accordingly, interfaces 13–15 are adapted to provide query results in various formats, according to various communication protocol, such as the TCP/IP protocol. For example, client system 8 can receive query results and alerts in WAP format. Usually, a client system receives a query result comprising of text, audio stream, video stream. Such a query result often comprises of a URL address, for allowing a client system to access desired information via a network such as the internet.

It is assumed that a client system can provide a client query and/or can update an alert criteria. System 1 accordingly provides said client system with a query result and/or an alert.

Conveniently, distribution means 4 comprising of interfaces 13–15, client manager 18, dispatcher 17, history manager 21, query and alert manager 19 and data builder 20. Client manager 18 holds client profiles. A client profile can indicate which queries were provided by the client system, at least one format in which either a query result and/or an alert is to be sent to a client system, a client identifier ID, and a list of alert criteria. Client Manager 18 manages user profiles and provides queries or alert criteria to alert engine 3 via query and alert manager 19. Each query/alert criteria is associated with said client ID. Conveniently, client manager 19 holds a table for mapping alerts to client systems.

Distribution means 4 interfaces between clients and the analysis means 5. Dispatcher 17 and interfaces 13–15 are adapted to receive client queries and/or alert criteria from client systems 7–8, to update client profiles and send said client queries/alert criteria to analysis means 5. Query results and/or alerts are generated by analysis means 5 and dispatched to client systems by distribution means 4.

Dispatcher 17 receives from client manager updated alert criteria and/or client queries and provides them to query and alert manager 19. Dispatcher 17 receives alerts and query results and in association with client manager 18 determines to which client system to send said alert and/or query result and in what format. Said alert and/or query result are provided to one of interfaces 13–15 and to the appropriate client systems. Dispatcher 17 receives query results and alerts from analysis system 5 via query and alert manager 19. In response to a reception of an alert or a query result, dispatcher 17 in association with client manager 18 determine which information to include in a query result or alert to be sent to a client system. Accordingly, a content object request is sent to data builder 20.

Data builder 20 accesses data manager 22 and provides dispatcher the requested information. For example, an alert can indicate that information source 30 provided at least one matching information packet that matches an alert criteria of client system 10. Dispatcher receives said alert and determines, in association with client manager 18 that the alert should contain additional information from the matching information source 30, such as a multimedia stream that was broadcasted by information source 30, whereas the matching information packets were driven from said multimedia stream.

Dispatcher sends data builder 20 a content object request to receive said multimedia stream. Said request usually determines the matching information ID and a content type/alert or query result format. Said multimedia stream is stored in a certain address within data manager 22, or in an external multimedia server (not shown). Said content object request to receive said address. Said address is provided to dispatcher 17 and via interface 13 and network 16 to client system 10. Eventually, said multimedia stream in displayed upon a screen of a digital television.

Conveniently, distribution means 4 maintains a list of distributor identifications ID, distributor type and user counter for each alert. Client manager 18 is adapted to handle client associated information such as client system profile, preferences, and alert criteria.

History manager 21 is adapted to maintain alert criteria and requests to update said criteria for client retrieval. History manager 21 receives requests to update an alert criteria from dispatcher 17 and stores said requests, for allowing a client system to view said requests.

Query and alert manager 19 routes client queries and alert criteria updates from dispatcher 17 and routes query results and alerts from analysis means 5 to dispatcher 17.

Retrieval means 13 comprising of a plurality of agents or receptors, such as agents 24, 27, 28 and 29. Said agents are coupled to various information sources, such as information sources 30–36 via networks 37 and 38 or via media 39. Agents 24, 27, 28 and 29 are adapted to receive information from various information sources, such as television channel 30, radio channel 31, news provider 32, web sites 33, IRC servers 34, bulletin boards 35 and streaming media provider 36, and provide information packets to analysis means 5. For example, agent 24 receives television broadcasts or video streams via cable network 37 and convert the television broadcast or video stream to a stream of information packets. Agent 24 can comprise of a dedicated encoder, a device for extracting clause caption out of said video stream or picture recognition and analysis means. Agent 27 receives radio broadcasts, transmitted by radio channel 31 over a wireless media, and convert said transmitted audio stream to a stream on information packets. Agent 28 is coupled, via network 38 to news provider 32, web sites 33, IRC servers 34, bulletin boards 35 for retrieving information packets transmitted from said information sources via network 38. Retrieval means 6 further comprising of retrieval management and prioritization component 29 for prioritizing content sources and channels and for balancing the load between agents/receptors.

Real time alert module 3 is adapted to receive alert criteria from query and alert manager 19 and to constantly match said alert criteria against portions of received information packets, said information packets provided by retrieval means 6. When an alert criteria is fulfilled, an alert indication is provided to query and alert manager 19. Conveniently, said alert indication comprising of a query ID and an information packet ID. Dispatcher 17 receives said alert indication accesses client manager 18 to determine which client system is to receive an alert, what additional information to provide said client system and in what format to sent the alert to said client system. Accordingly, dispatcher sends an result object request to data builder 20. Data builder 20 accesses data manager 22, receives the additional information, provides said information to dispatcher 17, and provides an alert to a client system, via an interface and network 16.

Data Manager 22 is adapted to store received information packets, audio streams and video streams. Optionally, data manager 22 is further adapted to allow data clients to get notification on data events such as data changes, data expiration, etc. and is further adapted to allow data providers to register as such.

Real time alert module 3 allows to generate alerts in real time, in response to previously provided alert criteria and information packets being received in real time. Real time alert engine is adapted to support various alerts, such as Boolean alerts and best effort alerts.

Real time search engine 26 allows to generate query results in real time. Real time search engine 26 is adapted to support various searching techniques, such as Boolean search and best effort search.

Classification module 24 is adapted to dynamic classification of information streams/groups of information packets. Classification module 24 dynamically determines a topic of a channel, thus allowing searches and alerts based upon a topic an information stream.

Figure 2:
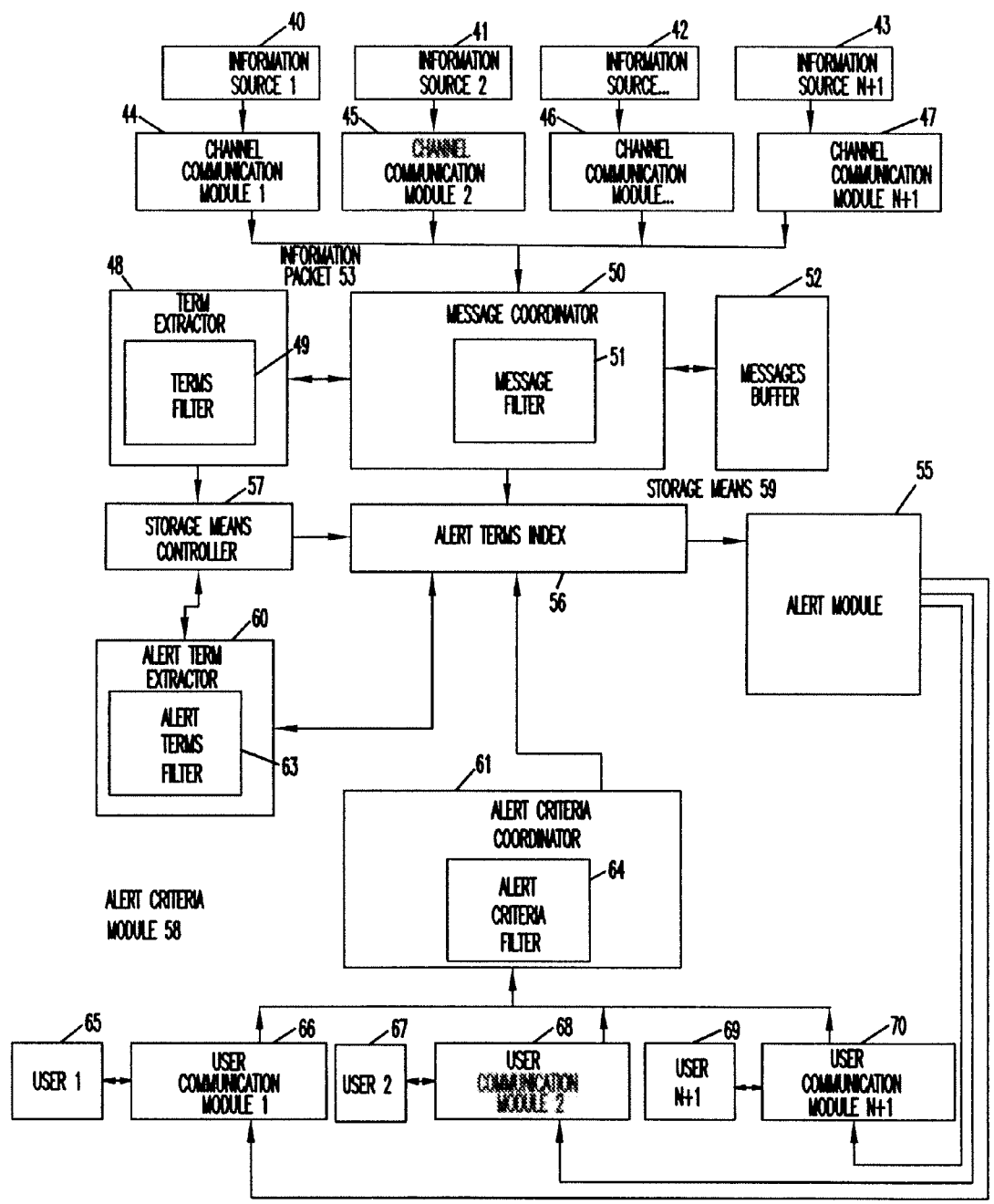
FIG. 2 is a simplified block diagram that illustrates the alert engine operations in association with related modules and data structures, in accordance with a preferred embodiment of the present disclosure.

Referring now to FIG. 2 illustrating a system 2 for real time alert. Although not part of the system 2, for the clarity of the disclosure only Information Sources 40, 41, 42, and 43 are shown connected to channel communication modules 44, 45, 46, and 47. For clarity of the disclosure FIG. 2 does not illustrate some portions of the distribution means 4, retrieval means 6 and analysis means 5 of FIG. 1.

FIG. 2 illustrates various optional modules/portions of system 2, such as, but not limited to message coordinator 50, message filter 51, terms filter 49, alert criteria term filter 63, alert criteria extractor 60.

Alert module 3 has information packet processor 53, storage means 59, storage means controller 57, alert module 55 and alert criteria module 58.

Information packet processor 53 having: message coordinator module 50 adapted to coordinate an handling of a plurality of information packets; message filter module 51 for filtering the plurality of information packets according to predefined rules; term extractor module 48 for performing parsing and stemming on said plurality of information packets; and terms filter 49 for excluding extracted terms according to predefined rules.

Storage means 59 have terms index 56 and messages buffer 52.

Alert criteria module 58 having: alert criteria coordinator module 61 to coordinate the processing of alert criteria; alert term extractor 60 to parse and stem incoming alert criteria in order to extract and process operative alert terms; alert terms filter 63 for excluding specific alert terms in a predefined manner. Alert criteria further comprising additional information such as information defining a relationship between alert terms, a client system identifier for determining which client provided said alert criteria, a weighing factor and a similarity threshold. Said additional information is not preprocessed but stored in storage means. Preferably, said additional information is stored in an alert criteria map.

Although no part of the Search Engine, for the clarity of the disclosure only, Users 65, 67, and 69 are shown connected to User Communication modules 66, 68, and 70.

In the preferred embodiment of the present disclosure, one information source may be a television channel that provided multimedia streams, that are later transformed into streams of information packets messages. It should be understood that in the following discussion of the present disclosure the general framework of television channels is used for purposes of description not limitation. Said search engine received text that is being either associated to the content of television channels or driven out of a multimedia stream provided by television stations. Text can be driven from a multimedia stream by various means such as special encoders, voice recognition means. Many television channels provide text in a format of clause caption. Although information packets will be referred to as messages, and information sources will be referred to as channels in the text of this document, it will be appreciated that in different embodiments of the present disclosure other sources of information could be used such as news channels, video channels, music channels, various Internet sites and the like. It will also be appreciated that in other embodiments of the present disclosure, the information packets processed could be in addition to text format in other diverse data formats such as streaming video, still pictures, sound, applets and the like.

The messages from the various channels are received through Channel communication modules 44, 45, 46, and 47 into real time alert system 3 and processed therein. Channel communication modules 44, 45, 46, and 47 build and transfer the messages to Messages Coordinator Module 50 for processing. The messages transferred consist of control data such as channel ID, Message ID, timestamp of the time of arrival, and information content such as a phrase, a sentence, a news item, a music item or a video item.

Messages Coordinator 50 coordinates the handling of the incoming messages, and provides processed messages to term extractor 48 and to messages buffer 52. Messages Buffer 52 is a data structure that temporarily holds the incoming messages. In the preferred embodiment of present disclosure Messages Buffer 52 is a cyclic buffer. Message Filter 51 filters messages according to user-defined rules. For example, messages with a specific channel ID or messages containing specific text might be blocked and discarded.

Term Extractor 49 receives the messages from Messages coordinator 48, performs message parsing, and stemming (finding the lexicographic root) of the resulting terms. Once the message is parsed and stemmed, a list of terms within said message is created. The terms extracted are sent to further processing accompanied with identifying data such as channel ID, message ID and the message arrival time.

Terms Filter 49 passes the terms through a series of filters, which can change or discard specific terms. For example, Terms Filter 49 can discard stop-words, frequently used words, one-character words, user-defined words, system-defined words such as "a", "about", "else", "this", and the like.

Storage means controller 57 receiving the at least one extracted term, accesses alert terms index 56, determines whether an extracted term out of said at least one extracted term matches an alert term stored in alert terms index 56 and accordingly updates the matching term information stored within alert term index 56. Extracted terms that do not match any alert term are discarded. Storage means controller 57 also schedules and initiates periodically a process that removes information regarding matches between an alert criteria and between irrelevant or time-decayed terms from alert terms Index 56. Description of the process will be set forth hereunder.

Alert terms Index 56 consists of indexed alert terms and message identifiers that point to information relating to a reception extracted terms that match an alert term during a predetermined period of time. Alert terms Index 56 is designed to enable fast term indexing and deletion. The indexing is done per matching term, while deletion is done per message. When the message is discarded for becoming irrelevant or time-decayed, information regarding a reception of matching terms being extracted from said information packet is deleted from alert terms Index 56. Alert terms Index 56 is a means to realize real time alert regarding real time content.

According to one preferred embodiment of the invention, at least a portion of a request to create or update an alert criteria pass through alert criteria coordinator 61, alert criteria terms extractor 60 alert terms filter 63 and undergo preprocessing steps that are analogues to preprocessing steps of a massage. An alert criteria can contain several alert terms, and associated information such as a weighing factor, or a similarity threshold. Said associated information does not undergo said preprocessing steps.

Alert module 55, coupled to storage means 59, for processing at least a portion of the matching extracted term information to determine whether to issue an alert; and for issuing at least one alert to at least one client system, according to said determination. Conveniently, when a matching extracted term that matches an alert term is received, alert module 55 checks in which alert criteria said alert term is found, and processes matching extracted term information associated to said alert criteria to determine which alert criteria are fulfilled, and to which client systems to issue an alert.

An alert is send to the users 65, 67, and 69 via User communication modules 66, 68, and 70. User Communication modules 66, 68, and 70 communicate between the system 3 and the users 65, 67, and 69. For each user 65, 67, and 69, a new instance of communication module 66, 68, and 70 is activated. User communication modules 65, 67, and 69 transfer alert criteria updates initiated by the users to system 3 module and return results back to the users.

The operation of the system 3 will be described next. Information packets are extracted out of an incoming information stream from specific information sources such as television stations, radio stations by channel communication modules 44, 45, 46, and 47. The messages are structured, times-stamped and transferred to the operative modules of the Search Engine. The structured messages contain control data such as channel ID, message ID, time stamp indicative of the time of arrival and content information such as textual data. The messages transferred through Message Filter 51 which blocks specific messages according to predefined rules. For example, messages originating in particular channels or having specific text content or having particular characteristics could be discarded. The filtered messages are inserted into Messages Buffer 52 which is managed and synchronized by Messages Coordinator 50. Messages coordinator 50 operates in conjunction with Messages Buffer 52, which is designed to hold the messages to be retrieved for later processing. Messages Buffer 52 is a cyclic buffer. Incoming messages are inserted at one end of the Messages buffer 52 while retrieved from the other end. The messages are kept in the buffer for a predefined period of time. Time-decayed messages may be discarded. In other embodiments of the disclosure, other methods could be used to delete messages from Messages Buffer 52 such as deletion by predefined priorities. For example, messages from a specific low-priority channel could be discarded first. When a message is deleted from message buffer 52 information relating to the reception of extracted terms that were extracted from said messages are deleted from term index. Messages are provided by message coordinator 50 to Term Extractor 48. Term Extractor 48 performs message parsing, stemming (finding the lexicographic root) of the resulting tokens and extracts the tokens from the messages. The tokens are transferred through a series of Terms Filters 49. Terms Filters 49 can change or discard a token according to predefined parameters. For example, Terms Filters 49 can discard stop-words, one-letter words, frequently used words, user-predefined words and the like. Term Extractor 48 further attaches identifiers to the tokens such as channel ID, message ID and time of arrival. Finally, Term Extractor 48 dispatches the terms to storage means controller 57. Storage means controller 57 receives at least one extracted term and accesses alert terms hash 56 to determine whether an extracted term matches a term alert previously stored within alert terms index 56. If the answer is yes storage means controller 57 updated matching extracted term information, representative of a reception of a matching extracted term.

Conveniently a reception of a matching extracted term initiates a process of checking at least a portion of the matching extracted information to determine whether an alert criteria was fulfilled.

Alert terms Index 56 is a data structure containing entries indexed by extracted terms and matching extracted term information.

A more detailed description of the operations related to inserting terms and removing terms from alert terms index 56 will be set forth hereunder in association with the related drawing.

Alert criteria, and a request to update alert criteria are initiated by users. User communication modules 66, 68, and 70 transfer alert criteria from the user into the alert modules. An alert criteria hold one or more alert terms. Conveniently, the handling of an request to update or create an alert criteria by alert criteria module 58 is analogues to the handling of an incoming message, but portions of said request dare not preprocessed in the same manner. Alert criteria are filtered by alert criteria filter 64, and handled by alert criteria coordinator 61. Alert criteria coordinator 61 functions in respect to the incoming alert criteria in a like manner to Messages Coordinator 50 functions in respect to the incoming messages. Alert criteria coordinator 61 receives the queries from user communication modules 66, 68, and 70 and transfers them to the alert term extractor 60. Alert term extractor 60 parses the alert criteria and stems the resulting tokens. The tokens are filtered by a series of alert criteria filters 63, structured into alert-terms by the attachment of control information such as alert criteria Id and time-stamp.

Scoring, or ranking of channels to be returned as a result, is done using a model that computes the similarity between an alert criteria and a group of information packets provided by a single information source. Some of the parameters involved in computing the results are: Total amounts of terms in channel in the predefined time interval, number of matching terms in the channel in the predefined time interval, total number of channels searched in the predefined time interval, elapsed time since the last appearance of the matching term in the channel in the predefined time interval and matching terms position in the channel. Additional factors for the score: terms in proximity to matching term, part of speech of matching terms, relevant term frequency and importance in the language of the channel.

The parameters further enable alert module 55 to rank the resulting channels, and to generate a similarity rank, to be further compared to an alert similarity threshold, in addition to standard ranking methods by the time parameter as well by giving more weight to phrases than to the collection of single words.

Figure 3:
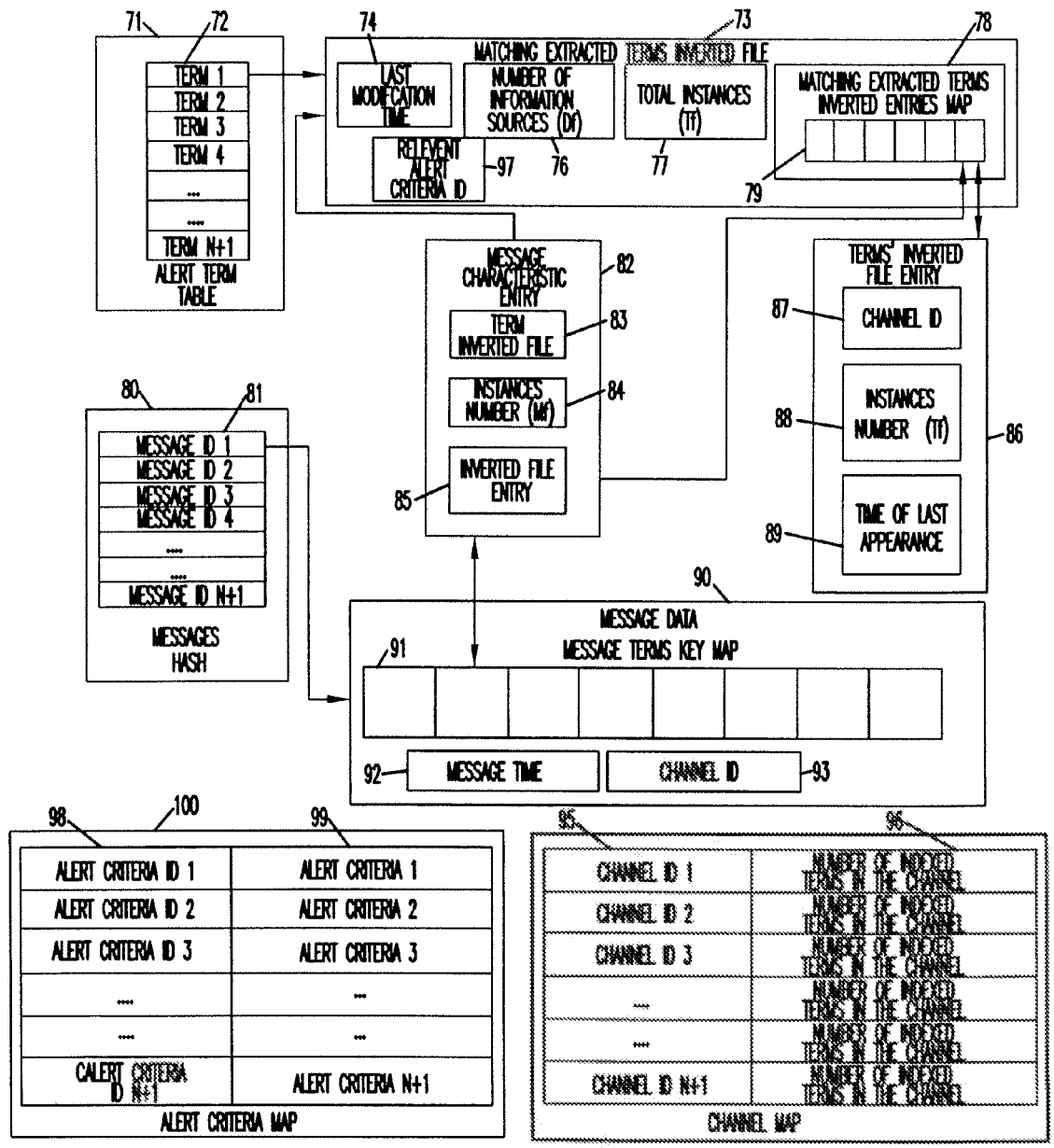
FIG. 3 is a simplified block diagram that illustrates the structure of the alerts Index tables, in accordance with a preferred embodiment of the present disclosure.

Referring now to FIG. 3 that illustrates the structure of the alert terms index 56 tables. The alert terms Index consists of two main units: the alert terms hash 71 and the messages hash 80. Additionally alert terms Index contains the Channel Map unit 94.

Alert terms hash 71 comprises the alert term table 72 and the associated extracted matching terms Inverted File 73. The alert term Hash 71 comprises of entries whose keys are terms. Therefore, alert term Hash 71 provides fast access to the entries by using terms as access keys. The said structure also provides for fast insertion of terms into the table. Alert term table 72 stores a plurality of alert terms, provided by client systems. Extracted matching terms inverted file 73 stores matching extracted terms information, representative of a reception of extracted terms that match alert terms during a predetermined period of time. Said extracted terms are also referred to a extracted matching terms.

The matching extracted terms inverted file 73 comprises of a sorted list of matching extracted terms inverted entries map 78 and at least one of the following files: (a) a total number of references (Total Instances) 77 to the matching extracted term in all the messages currently stored in Messages Buffer 52 of FIG. 2, (b) the modification time of the extracted matching term (Last Modification Time) 74, or (c) a number of channels that contain the extracted matching term 76. Each entry, such as entry 786 in extracted matching terms inverted entries map 78 is keyed by the channel ID 87 and has the number of references (Instances No) 88 to the extracted matching term in that channel and the time of the last appearance of the extracted matching term in the channel (Time of Last Appearance) 89. The number of references that are added to the Total Instances 77 could be used to determine the channel's relevance to a specific alert criteria.

Messages Hash 80 indexed by Message ID 81 in order to provide fast deletion of term's references by message. Messages Hash 80 comprises Message ID table 81 and the associated Message Data table 90. Each entry in Message Data table 90 contains information about one message and pointed to by a Message Hash entry 81. Message Data table 90 consists of (a) the channel ID 93 (b) message time 92, and (c) Message Terms Keyed Map 91. The Message Terms Keyed Map 91 is a sorted list of Message Characteristics Entries 82. A pointer 83 keys each entry, which is unique to each term. Therefore, a Message Characteristics Entry 82 can be found easily by a specific term. Message Characteristics Entry 82 contains the following information: (a) the number of times the related extracted matching term was referred to in the relevant message (Instances No) 84, and (b) a pointer to the related Inverted File Entry 85.

The Channel Map 94 is a list sorted by channel IDs 95. For each channel ID 95, Channel Map 94 holds the total number of currently indexed extracted matching terms that belong to the channel 96. In the preferred embodiment of the present disclosure, said total number relates to the number of extracted matching terms after filtering. In a different embodiment of the present disclosure, the total number could relate to the number of extracted matching terms before filtering or to the average of both values.

The alert criteria map 100 is a list sorted by a criteria IDs 98. For each alert ID 98, alert criteria map 100 holds an alert criteria. An alert criteria can hold more than a single alert term, a weighing factor given to each alert term of the alert criteria, a similarity factor and the alert term ID of each of the alert terms of said alert criteria, for allowing to process matching extracted term information representative of a reception of terms of the alert criteria. Alert criteria map 100 is built and updated according to requests issued by client systems.

The operations supported by the alert terms index 56 of FIG. 2 will be described next. Alert terms index 56 of FIG. 2 supports three modes of operation: (1) an update, a deletion or creation of an alert criteria, (2) extracted matching information deletion by message ID, and (3) extracted matching term information deletion by the garbage collection process.

An alert criteria is updated, deleted or created by storage means controller 57, in response to a reception of a request from a client system. The whole update criteria is given an alert criteria ID, said ID and the alert criteria are stored in alert criteria map 100. Each alert term of the alert criteria is indexed and inserted to alert terms index 56.

Storage means controller 57 handles an update of matching extracted information when an extracted term that matches an alert term is received. Accordingly, the following sequence of steps is performed:

One) the alert Term 72 to extracted matching Terms Inverted File 73 link is accessed or created. A pointer to extracted matching Terms Inverted File (invertedFilePtr) is saved.

Two) the Total Instances 77 member's value in extracted matching Terms Inverted File 73 pointed at by invertedFilePtr is increased by one.

Three) the Last Modification Time 74 member in extracted matching Terms Inverted File 73 pointed at by invertedFilePtr is updated.

Four) the entry for channel Id 87 in extracted matching Terms Inverted Entries Map 79 is accessed or created. A pointer to the entry is saved as invertedFileEntryPtr.

Five) the value of Instances No 88 member in the entry pointed at by invertedFileEntryPtr is increased by one.

Six) the appropriate Message Data is accessed or created in Message Hash 80. A pointer to the entry is saved as messageData.

Seven) the Message Characteristic Entry 82 in Message Data 90/Message Terms Keyed Map 91 is accessed by invertedFilePtr or created. A pointer to the entry is saved as messageCharac.

Eight) in the entry pointed at by messageCharac the value of Instances Number 84 member is increased by one.

Nine) in the entry pointed at by messageCharac, the invertedFileEntry pointer is set to point at invertedFileEntryPtr.

Ten) in the Message Data 90, the Message Time 92 member is updated.

Eleven) in the Message Data 90 the channel ID 93 member is updated.

A deletion of extracted matching term information representative of a reception of matching extracted terms extracted from a message occurs when a message is deleted. A message can be deleted when the Messages Buffer 52 of FIG. 2 is full or a predetermined time interval indicative of the period a message should be kept in the buffer 52 has been completed. For extracted matching term information deletion by Message Id the following sequence of steps is performed:

One) the appropriate Message Terms Keyed Map 91 is obtained from Messages Hash 80.

Two) for each Message Characteristics Entry 82 that points to extracted matching Terms Inverted File 73:

Three) the pointed extracted matching Terms Inverted File 73 is accessed and Total Instances 77 member's value is decreased by the Instances No 84 member's value in Message Characteristic Entry 82.

Four) the Term Inverted Entry 86 is accessed and the Instance Number 88 value is decreased by Message Characteristic Entry's local Instances No member 84 value.

Five) Message Characteristic Entry 82 is deleted.

Six) steps 'c' through 'e' are repeated until Message Terms Keyed Map 91 is empty.

Seven) the Message Id 81/Message Terms Keyed Map 91 link is deleted.

Deleting an extracted matching term information not via Message Id 81 is done periodically by the garbage collecting process. The deletion is performed if the extracted matching term's last modification time occurred before a specific point in time in the past which implies that there are currently no messages that the specific extracted matching term refers to or that the extracted matching term's Total Instances 77 member's value equals zero. When a extracted matching term is found that satisfies the above conditions a simple deletion of the alert Term 72 to extracted matching Terms Inverted File 73 link is performed.

According to another preferred embodiment of the invention, a single data structure can support both real time searches and real time alerts. Terms Index Table will store alert criteria and received terms. An alert criteria will not be deleted from terms index unless a client system requested such a deletion. Each entry of the table will have an additional field, for identifying the indexed term as at least a portion of an alert criteria or as a received extracted term. According to said embodiment, when storage means controller 57 receives an extracted term is determines whether said extracted term matchers matches an alert term, and if the answer is 'no' said term is indexed in alert terms hash 56, with an indication that it is not an alert term. Said extracted term can be deleted from alert terms module 56 by message ID or by a garbage collecting process.

Figure 4:
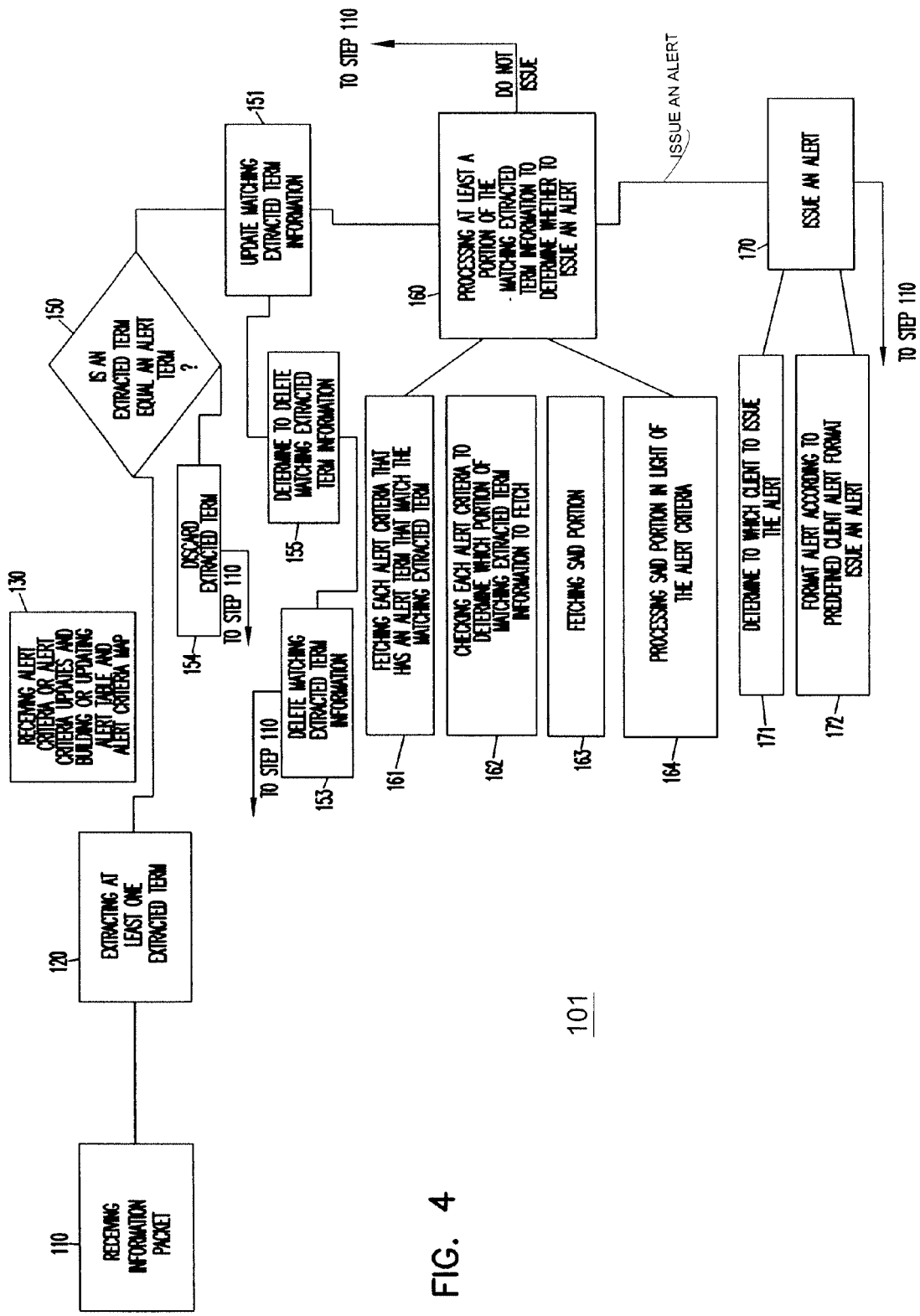
FIGS. 4–6 are flow chart diagrams illustrating a method for real time alert, according to a preferred embodiment of the invention.
Figure 5:
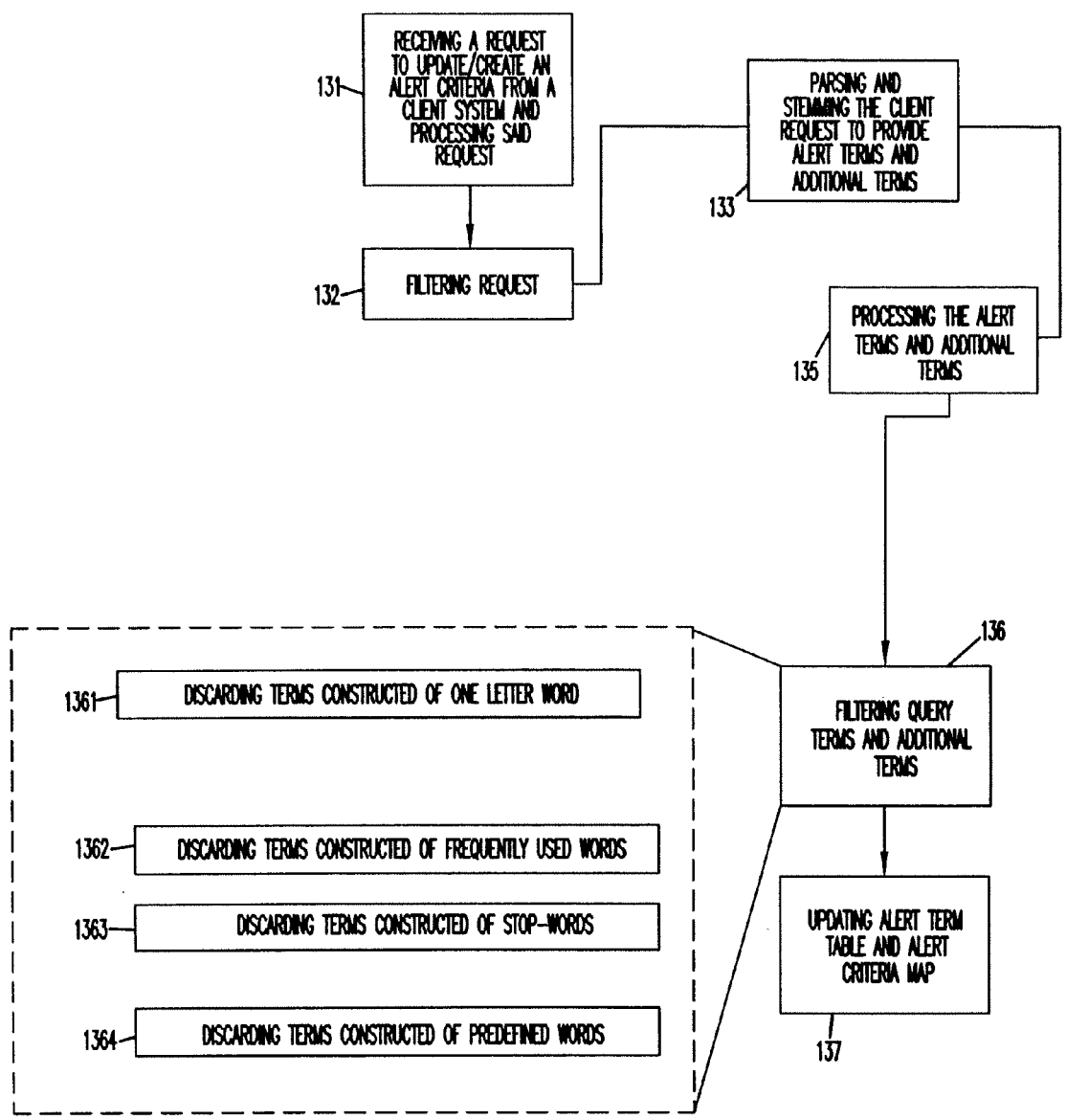
Figure 6:
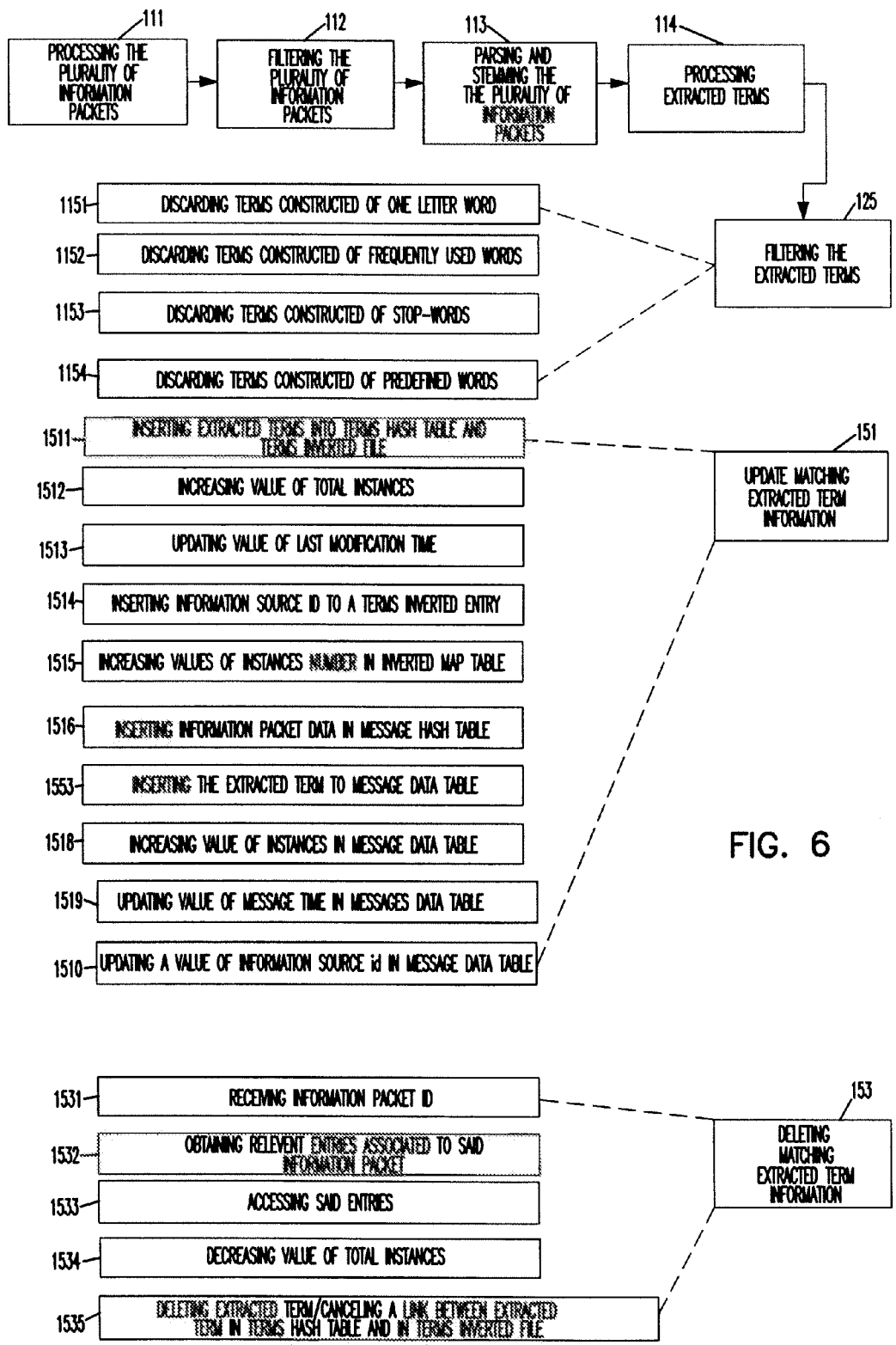

Referring to FIGS. 4–6 illustrating method 101 for real time alert, method 101 comprising of the following steps:

Step 110 of receiving an information packet; said information packets either provided by an information source or representative of a portion of a received signal provided by an information source.

Step 110 is followed by step 120 of extracting at least one extracted term out of the information packet.

Step 120 is followed by step 150 of determining whether an extracted term out of said at least one extracted term matches an alert term, and accordingly either discarding said extracted term (step 154) or updating (step 151) a matching term information representative of a reception of matching extracted terms, an alert criteria comprising of at least one alert term, said matching term information being stored in a storage means that is configured to allow fast insertion and fast deletion of content. Conveniently, step 150 is preceded by step 130 of receiving alert criteria from client systems and processing said criteria to update or create an entry in alert term table 72 and alert criteria map 101. Conveniently step 154 is followed by step 110.

Step 151 is followed by steps 160 and 155. Step 160 of processing at least a portion of the matching extracted term information to determine whether to issue an alert. Conveniently, said processing step can implement complex matching techniques, Boolea matching techniques, probabilistic matching techniques; fuzzy matching techniques; proximity matching techniques; and vector based matching techniques. Said process can be based upon an analysis of the matching extracted term information representative of a reception of matching extracted terms from a single information source, said information source being identified by a channel ID. Conveniently, a portion of the matching extracted term information that is processed, said portion is determined by an alert criteria. Preferably, said alert criteria comprising of the at least matching extracted term received in step 110. If, for example, a matching extracted term is a part of an alert criteria, said alert criteria further comprising an additional alert term, a portion of matching extracted term information representative of both alert terms is processed in order to determine whether to issue an alert.

Step 160 is followed by step 170 of issuing at least one alert to at least one client system, according to said determination.

Step 155 of determining to delete a message and accordingly to delete matching extracted term information representative of a reception of matching extracted terms extracted from said information packet.

Conveniently, steps 110 and 120 further comprise additional preprocessing steps, such as step 111 of processing the plurality of information packets by adding control data to said information packets. The control data comprising of information packet identification, information source identification and time of arrival. Step 112 of filtering the plurality of information packets. Step 113 of parsing and stemming the plurality of information packets. Step 124 of processing said extracted terms by adding control information to said extracted terms. Step 125 of filtering the extracted terms to generate filtered extracted terms. Preferably, step 125 further comprising at least one of the following steps: step 1251 of discarding said terms constructed of one-letter words; step 1252 of discarding said terms constructed of frequently used words; step 1253 of discarding said terms constructed of stop-words and step 1254 of discarding said terms constructed of predefined words.

Step 151 of updating a matching extracted term information conveniently involves the steps of storing the information packet and related control data in the storage means; and linking between the stored information packet and the matching extracted term information. Preferably, step 151 comprising the following steps: step 1512 of increasing a value of total instances in a matching extracted terms inverted file associated to said matching extracted term; step 1513 of updating a value of last modification time in said accordingly updating a matching extracted terms inverted file; step 1514 of inserting an information source identification, said information source provided the extracted term, to a matching extracted terms inverted entry map table in said terms inverted file; step 1515 of increasing a value of instances number in said matching extracted inverted entry map table associated with said information source identification in said matching extracted terms inverted file; step 1516 of inserting information packet data in a messages hash table; step 1517 of inserting the matching extracted term from said information packet to a messages data table; step 1518 of increasing a value of instances in said messages data table by one; step 1519 of updating a value of message time in said messages data table; and step 1510 of updating a value of information source identification in said message data table.

Step 151 is followed by step 153 of deleting from the matching extracted terms index data structure the matching extracted term information representative of reception of matching extracted term extracted from an information. Said deletion occurs either after a message from which said term was expired is stored in the message buffer for a predetermined period of time. Said matching extracted term information can also be deleted as a result of a garbage collection process, said process is based upon a deletion of matching extracted terms that are not mentioned during a certain period.

Preferably, step 153 comprising the steps of: step 1531 of receiving an information packet identification, whereas the matching extracted term information representative of reception of matching extracted terms extracted from the information packets are to be deleted; step 1532 of reading the information packet identification from the messages hash table in said alert terms index data structure; step 1532 of obtaining relevant entries of said extracted terms belonging to said information packet in said messages data; step 1533 of accessing said matching extracted terms inverted file for each said terms entry pointed to said matching extracted terms inverted file; and step 1534 of decreasing a value of said total instances by a value of said instances number for each said terms entry pointed to said matching extracted terms inverted file. Step 153 further comprises of step 1535 of deleting a matching extracted term information by a garbage collection process.

Conveniently, step 130 comprising step 131 of receiving a request to update or create an alert criteria and processing the request by adding control data. Step 130 is followed by step 132 of filtering the request. Said filtering involves excluding said requests generated from predefined client systems. Step 130 is also followed by step 133 of parsing and stemming the alert criteria to generate alert terms and additional terms. Additional terms can define a relationship between alert terms, a weight factor associated to the alert terms, a similarity threshold and to indicate which client system are to receive an alert when said criteria is matched. Step 134 is followed by step 135 of processing the alert terms and additional information by adding relevant control information. Step 135 is followed by step 136 of filtering said alert terms and additional terms. Step 136 further comprising of at least one of the following steps: step 1361 of discarding said alert terms constructed of one-letter words; step 1362 of discarding said alert terms constructed of frequently used words; step 1363 of discarding said alert terms constructed of stop-words; and step 1364 of discarding said alert terms constructed of predefined words. Step 136 is followed by step 137 of storing said alert terms in a alert term index data structure for a period that is shorter than a predefined period of time or until an alert criteria removal request is received from a user.

Conveniently step 160 comprising step 161 of fetching each alert criteria that have an alert term that matches a matching extracted term that was received at step 110. Step 162 of checking each alert criteria to determine which portion of matching terms extracted information to fetch. Step 163 of fetching said portion and step 164 of processing said portion, in light of the alert criteria to determine whether to issue an alert.

Conveniently, step 164 is based upon a parameter out of a group consisting of: a total amount of extracted terms provided by an information source in a predefined time interval; an elapsed time since the extracted term was provided by the information source in said predefined time interval; and an extracted term position in the information source.

Conveniently, step 164 involves computing a similarity between an alert criteria and information indicating a reception of a group of information packets. The similarity reflects at least one of the following parameters: a total amounts of extracted terms being received from at least one information source during a predefined time interval; a number of matching extracted terms being received from at least one information source during the predefined time interval; a total number of information sources being searched during the predefined time interval; an elapsed time since a last appearance of a matching extracted term from an information source during the predefined time interval; a position of matching extracted terms in at least one information source; an extracted term in proximity to a matching extracted term; a part of speech of a matching extracted term; and a matching extracted term frequency and importance in a language of the information source. Said similarity can be compared to a predefined similarity threshold, in order to determine whether to send an alert to a client system. Preferably, the group of at least one information packet comprising of at least one information packet received from a single information source.

Step 170 comprising step 171 of determining to which client system to send an alert. Conveniently step 171 is followed by step 172 of determining a format of an alert to be sent to a client system, according to a predefined client system format and formatting the alert according to said client system format. Preferably, the predetermined client format selected from a group consisting of: HTML format; WAP format; PDA compatible format; Digital television compatible format; electronic mail format; and multimedia stream format.

Preferably, an alert comprising of at least one field selected from a group consisting of: an information source identifier field, for identifying an information source that either provided a matching extracted packet or for identifying an information source that provided a received signal, whereas a portion of said received signal being represented in an information packet from which the extracted term was extracted; a link field, for allowing the client system to be linked to the information source or for allowing the client system to receive additional information from said information source; and an information source category identification, identifying a category of information source that provided the matching extracted term. Said additional information is selected from a group consisting of: a multimedia stream originated by said information source; a stream of information packets originated by said information source; a multimedia stream associated to the information packet from which the extracted term was extracted; a stream of information packets, comprising the extracted term.

Conveniently, a client system is configured to generate a unique information source category indication in response to a reception of said information source category identification and to generate a unique information source indication in response to a reception of said information source identification.

It will be apparent to those skilled in the art that the disclosed subject matter may be modified in numerous ways and may assume many embodiments other then the preferred form specifically set out and described above.

Accordingly, the above disclosed subject matter is to be considered illustrative and not restrictive, and to the maximum extent allowed by law, it is intended by the appended claims to cover all such modifications and other embodiments which fall within the true spirit and scope of the present invention. The scope of the invention is to be determined by the broadest permissible interpretation of the following claims and their equivalents rather then the foregoing detailed description.

We claim:

1. A method for real time alert, comprising the steps of:
   receiving an information packet, said information packets either provided by an information source or representative of a portion of a received signal provided by an information source;
   extracting at least one extracted term out of the information packet;
   determining whether an extracted term out of said at least one extracted term matches an alert term within an alert criteria, and accordingly updating a matching term information representative of a reception of matching extracted terms, said matching term information being stored in a storage means that is configured to allow fast insertion and fast deletion of content;
   processing at least a portion of the matching extracted term information to determine whether to issue an alert; and
   issuing at least one alert to at least one client system, according to said determination,
   wherein the alert comprises at least one field selected from the group consisting of:
   an information source identifier field,
   a link field, and
   an information source category identification.

2. The method of claim 1, wherein the processing at least a portion of the matching extracted term information is determined by at least one alert criterion.

3. The method of claim 2, wherein the at least one alert criterion comprises at least one alert term that matches the at least one matching extracted term.

4. The method of claim 1, wherein the matching term information representative of a reception of matching extracted terms is updated during a predetermined period of time.

5. The method of claim 1, further comprising the steps of:
   storing the information packet and related control data in the storage means; and
   linking between the stored information packet and the matching extracted term information.

6. The method of claim 1, wherein the storage means holds an index data structure.

7. The method of claim 1, wherein the step of processing is preceded by at least one preprocessing step selected from the group consisting of:
- adding control data to said information packet,
- filtering the information packet,
- processing an extracted term by adding control information to said extracted term, and
- filtering the extracted term, wherein said filtered extracted terms are matched against alert terms.

8. The method of claim 1, wherein the extracted term is extracted out of the information packet by parsing and stemming the information packet; and wherein the step of filtering further comprises a step selected from the group consisting of: (a) discarding a term constructed of a one-letter word; (b) discarding a term constructed of a frequently used word; (c) discarding a term constructed of a stop-word; and (d) discarding a term constructed of a predefined word.

9. The method of claim 1, further comprising deleting the information packet; and deleting the linked matching extracted term information.

10. The method of claim 9, wherein the step of deleting the information packet further comprises the steps of:
- receiving an information packet identification;
- reading the information packet identification from the messages hash table;
- obtaining relevant entries of said matching extracted terms belonging to said information packet; and
- accessing a matching extracted terms inverted file for each of said matching extracted terms entry pointed to by said terms inverted file.

11. The method of claim 10, wherein the step of deleting further comprises the step of decreasing a value of said total instances by a value of said instances number for each of said matching extracted terms entry pointed to by said terms inverted file.

12. The method of claim 9, wherein the step of deleting further comprises deleting an extracted term by a garbage collection process; and canceling a link between said term in said terms hash table and said terms inverted file.

13. The method of claim 1, wherein the alert terms and associated matching extracted term information are stored in an alert terms hash;
wherein alert criteria are stored in an alert criteria map; and
wherein the linked information packets are stored in a message hash.

14. The method of claim 13, wherein the matching extracted term information is associated to a single matching extracted term comprising at least one information field selected from the group consisting of:
- a last modification time field, indicating a most recent time of reception of the matching extracted term, during a predetermined period of time,
- a number of channels containing term, indicating a number of information sources that provided the matching extracted term during a predetermined period of time,
- a total instances field, indicating a total amount of receptions of the matching extracted term during a predetermined period of time, and
- a terms inverted entries map, comprising of a plurality of matching terms inverted file entries, each entry holding information representative of a reception of the matching extracted term from a single information source during a predetermined period of time.

15. The method of claim 14, wherein each matching term inverted file entry comprises at least one field selected from the group consisting of:
- a channel identifier, for identifying the information source that provided the matching extracted term during a predetermined period of time,
- an instances number, for indicating a total amount of receptions of the matching extracted term from an information source during a predetermined period of time, and
- a time of last appearance, for indicating a most recent time of reception of the matching extracted term from an information source during a predetermined period of time.

16. The method of claim 15, wherein each information packet is further associated to a message terms key map, said message terms key map comprising of a plurality of message characteristic entries, each message characteristic entry associated to a matching extracted term being extracted from the information packet, said message characteristic entry comprising at least one field selected from the group consisting of:
- a term inverted file, for pointing to the matching extracted term information,
- an instance of number, for indicating a number of times said matching extracted term appeared in the information packet, and
- an inverted file entry, for pointing to a terms inverted file entry.

17. The method of claim 1, wherein the information source is selected from the group consisting of: data network providers, chat channels providers, news providers, and music providers.

18. The method of claim 1, wherein the information packets comprises content selected from the group consisting of: text, audio, video, multimedia, and executable code streaming media.

19. The method of claim 1, wherein the step of processing further comprises computing a similarity between an alert criterion and matching term extracted information indicating a reception of group of at least one matching information packet.

20. The method of claim 19, wherein the group of at least one information packet comprises of at least one information packet received from a single information source.

21. The method of claim 19, wherein the similarity reflects at least one of the following parameters:
- a total amounts of extracted terms being received from at least one information source during a predefined time interval;
- a number of matching extracted terms being received from at least one information source during the predefined time interval;
- a total number of information sources being searched during the predefined time interval;
- an elapsed time since a last appearance of a matching extracted term from an information source during the predefined time interval;
- a position of matching extracted terms in at least one information source;
- an extracted term in proximity to a matching extracted term;
- a part of speech of a matching extracted term; and
- a matching extracted term frequency and importance in a language of the information source.

22. The method of claim 1, wherein the step of processing implements a matching technique selected from the group consisting of:
- Boolean based matching,
- probabilistic matching,
- fuzzy matching,
- proximity matching, and
- vector based matching.

23. The method of claim 1, wherein the step of processing implements complex matching techniques.

24. The method of claim 1, wherein the step of issuing an alert further comprises determining to which client system to send an alert.

25. The method of claim 1, wherein the step of issuing an alert further comprises:
- determining a format of an alert to be sent to a client system, according to a predefined client system format; and
- formatting the alert according to said client system format.

26. The method of claim 25, wherein said predetermined client format is selected from the group consisting of:
- HTML format,
- WAP format,
- PDA compatible format,
- Digital television compatible format,
- electronic mail format, and
- multimedia stream format.

27. The method of claim 1, wherein the link field allows the at least one client system to receive additional information is selected from the group consisting of:
- a multimedia stream originated by said information source,
- a stream of information packets originated by said information source,
- a multimedia stream associated to the information packet from which the extracted term was extracted,
- a stream of information packets, comprising the extracted term.

28. The method of claim 1, wherein the at least one client system is configured to generate a unique information source category indication in response to a reception of said information source category identification; and wherein the at least one client system is configured to generate a unique information source indication and in response to a reception of said information source identification.

29. A method for real time alert, said method comprising the steps of:
- receiving an information packet, said information packets either provided by an information source or representative of a portion of a received signal provided by an information source;
- extracting at least one extracted term out of the information packet;
- determining whether an extracted term out of said at least one extracted term matches an alert term within an alert criteria, and accordingly updating a matching extracted term information representative of a reception of matching extracted terms during a predetermined period of time;
- processing at least a portion of the matching extracted term information to determine whether to issue an alert; and
- issuing at least one alert to at least one client system, according to said determination,
- wherein the alert comprises at least one field selected from the group consisting of:
  - an information source identifier field,
  - a link field, and
  - an information source category identification.

30. The method of claim 29, wherein the processing at least a portion of the matching extracted term information is determined by at least one alert criterion.

31. The method of claim 30, wherein the at least one alert criterion comprises at least one alert term that matches the at least one matching extracted term.

32. The method of claim 29, wherein the matching term information representative of a reception of matching extracted terms is undated during a predetermined period of time.

33. The method of claim 29, further comprising the steps of:
- storing the information packet and related control data in a storage means; and
- linking between the stored information packet and the matching extracted term information.

34. The method of claim 33, wherein the alert term and associated matching term information are stored in an alert hash, the alert criteria are stored in an alert criteria map, and the linked information packet is stored in a message hash.

35. The method of claim 34, wherein the matching extracted term information is associated to a single matching extracted term comprising at least one information field selected from the group consisting of:
- a last modification time field, indicating a most recent time of reception of the matching extracted term, during a predetermined period of time;
- a number of channels containing term, indicating a number of information sources that provided the matching extracted term during a predetermined period of time;
- a total instances field, indicating a total amount of receptions of the matching extracted term during a predetermined period of time; and
- a terms inverted entries map, comprising of a plurality of terms inverted file entries, each entry holding information representative of a reception of the matching extracted term from a single information source during a predetermined period of time.

36. The method of claim 35, wherein each inverted file entry comprises at least one field selected from the group consisting of:
- a channel identifier, for identifying the information source that provided the matching extracted term during a predetermined period of time,
- an instances number, for indicating a total amount of receptions of the matching extracted term from an information source during a predetermined period of time, and
- a time of last appearance, for indicating a most recent time of reception of the matching extracted term from an information source during a predetermined period of time.

37. The method of claim 36, wherein each information packet is further associated to a message terms key map, said message terms key map comprising a plurality of message characteristic entries, each message characteristic entry associated to a matching extracted term being extracted from the information packet, said message characteristic entry comprising at least one field selected from the group consisting of:
- a term inverted file, for pointing to the matching extracted term information;

an instance of number, for indicating a number of times said matching extracted term appeared in the information packet; and an inverted file entry, for pointing to a terms inverted file entry.

38. The method of claim 29, further comprising deleting the information packet; and deleting the linked extracted term information.

39. The method of claim 29, wherein the step of determining whether to issue an alert is based upon a parameter selected from the group consisting of:

a total amounts of extracted terms being received from at least one information source during a predefined time interval, a number of relevant extracted terms being received from at least one information source during the predefined time interval, a total number of information sources being searched during the predefined time interval, an elapsed time since a last appearance of a relevant extracted term from an information source during the predefined time interval, a position of relevant extracted terms in at least one information source;

extracted term in proximity to a relevant extracted term, a part of speech of a relevant extracted term, and a relevant extracted term frequency and importance in a language of the information source.

40. The method of claim 39, wherein the group of at least one information packet comprises at least one information packet received from a single information source.

41. The method of claim 29, wherein the step of processing implements a matching technique selected from the group consisting of:

Boolean based matching,
probabilistic matching,
fuzzy matching,
proximity matching, and
vector based matching.

42. The method of claim 29, wherein the step of processing implements complex matching techniques.

43. The method of claim 29, wherein the step of processing further comprises computing a similarity between an alert criteria and information indicating a reception of a group of at least one matching information packet.

44. A method for real time alert, said method comprising the steps of:

receiving an information packet; said information packets either provided by an information source or representative of a portion of a received signal provided by an information source;

extracting at least one extracted term out of the information packet;

determining whether an extracted term out of said at least one extracted term matches an alert term within an alert criteria, and accordingly updating a matching extracted term information representative of a reception of matching extracted terms;

processing at least a portion of the matching extracted term information to determine whether to issue an alert, in response to a reception of a matching extracted term; and issuing at least one alert to at least one client system, according to said determination, wherein the alert comprises at least one field selected from the group consisting of:

an information source identifier field, a link field, and an information source category identification.

45. The method of claim 44, wherein the processing at least a portion of the matching extracted term information is determined by at least one alert criterion.

46. The method of claim 45, wherein the at least one alert criterion comprises at least one alert term that matches the at least one matching extracted term.

47. The method of claim 44, wherein the matching term information representative of a reception of matching extracted terms is updated during a predetermined period of time.

48. The method of claim 44, wherein the matching extracted term information is representative of a reception of matching extracted terms during a predetermined period of time, and wherein said matching term information is stored in a storage means that is configured to allow fast insertion and fast deletion of content.

49. The method of claim 44, further comprising the steps of:

storing the information packet and related control data in the storage means; and linking between the stored information packet and the matching extracted term information, wherein a deletion of an information packet is followed by a step of deleting the linked extracted term information.

50. The method of claim 49, wherein alert terms and associated matching extracted terms information are stored in an alert terms hash, alert criteria are stored in an alert criteria map, and the linked matching extracted term information is stored in a message hash.

51. The method of claim 49 wherein the step of deleting the information packet further comprises of the steps of:

receiving an information packet identification;

reading the information packet identification from the messages hash table in said terms index data structure;

obtaining relevant entries of said extracted terms belonging to said information packet in said messages data; and accessing said terms inverted file for each of said terms entry pointed to by said terms inverted file.

52. The method of claim 44, wherein the storage means holds a term index data structure.

53. The method of claim 44, wherein the matching extracted term information is associated to a single matching extracted term comprising at least one information field selected from the group consisting of:

a last modification time field, indicating a most recent time of reception of the matching extracted term, during a predetermined period of time, a number of channels containing term, indicating a number of information sources that provided the matching extracted term during a predetermined period of time;

a total instances field, indicating a total amount of receptions of the matching extracted term during a predetermined period of time; and a terms inverted entries map, comprising a plurality of terms inverted file entries, each entry holding information representative of a reception of the matching extracted term from a single information source during a predetermined period of time.

54. The method of claim 53, wherein each inverted file entry comprises at least one field selected from the group consisting of:

a channel identifier, for identifying the information source that provided the matching extracted term during a predetermined period of time, an instances number, for indicating a total amount of receptions of the matching extracted term from an information source during a predetermined period of time, and a time of last appearance, for indicating a most recent time of reception of the matching extracted term from an information source during a predetermined period of time.

55. The method of claim 44, wherein each information packet is further associated to a message terms key map, said message terms key map comprising a plurality of message characteristic entries, each message characteristic entry associated to a matching extracted term being extracted from the information packet, said message characteristic entry comprising at least one field selected from the group consisting of:

a term inverted file, for pointing to the matching extracted term information, an instance of number, for indicating a number of times said matching extracted term appeared in the information packet, and an inverted file entry, for pointing to a terms inverted file entry.

56. The method of claim 44, wherein the step of processing further comprises computing a similarity between an alert criteria and information indicating a reception of a group of at least one matching information packet.

57. The method of claim 56, wherein the group of at least one matching information packet comprises at least one information packet received from a single information source.

58. The method of claim 56, wherein the similarity reflects at least one of the following parameters:

a total amounts of extracted terms being received from at least one information source during a predefined time interval;

a number of matching extracted terms being received from at least one information source during the predefined time interval;

a total number of information sources being searched during the predefined time interval;

an elapsed time since a last appearance of a matching extracted term from an information source during the predefined time interval;

a position of matching extracted terms in at least one information source;

extracted term in proximity to a relevant extracted term;

a part of speech of a matching extracted term; and a relevant extracted term frequency and importance in a language of the information source.

59. The method of claim 46, wherein the step of processing implements a matching technique selected from the group consisting of:

Boolean based matching,
probabilistic matching,
fuzzy matching,
proximity matching, and
vector based matching.

60. The method of claim 44, wherein the step of processing implements complex matching techniques.

61. The method of claim 44, wherein the step of issuing an alert further comprises:

determining to which client system to send an alert,
determining a format of an alert to be sent to a client system, according to a predefined client system format; and formatting the alert according to said client system format.

62. The method of claim 44, wherein the link field allows the at least one client system to receive additional information is selected from the group consisting of:

a multimedia stream originated by said information source, a stream of information packets originated by said information source, a multimedia stream associated to the information packet from which the extracted term was extracted, a stream of information packets, comprising the extracted term.

63. A method for real time alert, said method comprising the steps of:

receiving an information stream, said information stream either provided by an information source or representative of a portion of a received signal provided by an information source;

generating a plurality of information packets from said information stream;

extracting at least one extracted term out of the information packets;

determining whether an extracted term out of said at least one extracted term matches an alert term within an alert criteria, and accordingly updating a matching term information representative of a reception of matching extracted terms;

processing at least a portion of the matching extracted term information to determine whether to issue an alert; and issuing at least one alert to at least one client system, according to said determination, wherein the alert comprises at least one field selected from the group consisting of:

an information source identifier field,
a link field, and
an information source category identification.

64. The method of claim 63, wherein the processing at least a portion of the matching extracted term information is determined by at least one alert criterion.

65. The method of claim 64, wherein the at least one alert criteria comprises at least one alert term that matches the at least one matching extracted term.

66. The method of claim 63, wherein the matching term information representative of a reception of matching extracted terms is updated during a predetermined period of time.

67. The method of claim 63, further comprising the steps of:

storing an information packet and related control data in a storage means; and linking between the stored information packet and the matching extracted term information.

68. The method of claim 63, further comprising deleting the information packet; and deleting the linked extracted term information.

69. The method of claim 63, wherein the alert terms are stored in an alert terms hash, the alert criteria are stored in an alert criteria map, and the linked matching extracted term information is stored in a terms hash.

70. The method of claim 63, wherein the matching extracted term information is associated to a single alert term comprising at least one information field selected from the group consisting of:

a last modification time field, indicating a most recent time of reception of the matching extracted term, during a predetermined period of time, a number of channels containing term, indicating a number of information sources that provided the matching extracted term during a predetermined period of time, a total instances field, indicating a total amount of receptions of the matching extracted term during a predetermined period of time, and a terms inverted entries map, comprising of a plurality of terms inverted file entries, each entry holding information representative of a reception of the matching extracted term from a single information source during a predetermined period of time.

71. The method of claim 70, wherein each inverted file entry comprises at least one field selected from the group consisting of:

a channel identifier, for identifying the information source that provided the matching extracted term during a predetermined period of time, an instances number, for indicating a total amount of receptions of the matching extracted term from an information source during a predetermined period of time, and time of last appearance, for indicating a most recent time of reception of the matching extracted term from an information source during a predetermined period of time.

72. The method of claim 71, wherein each information packet is further associated to a message terms key map, said message terms key map comprising a plurality of message characteristic entries, each message characteristic entry associated to a matching extracted term being extracted from the information packet, said message characteristic entry comprising at least one field selected from the group consisting of:

a term inverted file, for pointing to the matching extracted term information, an instance of number, for indicating a number of times said matching extracted term appeared in the information packet, and an inverted file entry, for pointing to a terms inverted file entry.

73. The method of claim 63, wherein the step of determining whether to issue an alert is based upon a parameter out of the group consisting of:

a total amounts of extracted terms being received from at least one information source during a predefined time interval;

a number of relevant extracted terms being received from at least one information source during the predefined time interval;

a total number of information sources being searched during the predefined time interval;

an elapsed time since a last appearance of a relevant extracted term from an information source during the predefined time interval;

a position of relevant extracted terms in at least one information source;

extracted term in proximity to a relevant extracted term;

a part of speech of a relevant extracted term; and a relevant extracted term frequency and importance in a language of the information source.

74. The method of claim 63, wherein the step of processing implements a matching technique selected from the group consisting of:

Boolean based matching,
probabilistic matching,
fuzzy matching,
proximity matching, and
vector based matching.

75. The method of claim 63, wherein the step of processing implements complex matching techniques.

76. The method of claim 63, wherein the step of processing further comprises computing a similarity between an alert criteria and information indicating a reception of a group of at least one matching information packet.

77. The method of claim 76, wherein the group of at least one information packet comprises at least one information packet received from a single information source.

78. A method for real time alert, said method comprising the steps of:

receiving an information packet, said information packet either provided by an information source or representative of a portion of a received signal provided by an information source;

extracting at least one extracted term out of the information packet;

determining whether an extracted term out of said at least one extracted term matches an alert term within an alert criteria, and accordingly updating a matching term information representative of a reception of matching extracted terms;

processing a portion of the matching extracted term information to determine whether to issue an alert, said portion representative of a reception of at least one matching information from a single information source; and issuing at least one alert to at least one client system, according to said determination, wherein the alert comprises at least one field selected from the group consisting of:
an information source identifier field,
a link field, and
an information source category identification.

79. The method of claim 78, wherein the processing at least a portion of the matching extracted term information is determined by at least one alert criterion.

80. The method of claim 79, wherein the at least one alert criterion comprises at least one alert term that matches the at least one matching extracted term.

81. The method of claim 78, wherein the matching term information representative of a reception of matching extracted terms is updated during a predetermined period of time.

82. The method of claim 78, further comprising the steps of:

storing an information packet and related control data in a storage means; and linking between the stored information packet and the matching extracted term information.

83. The method of claim 78, further comprises deleting the information packet; and deleting the linked extracted term information.

84. The method of claim 78, wherein alert terms are stored in an alert terms hash, an alert criteria are stored in an alert criteria map, and wherein the linked matching extracted term information is stored in a terms hash.

85. The method of claim 78, wherein the matching extracted term information is associated to a single matching extracted term comprising of at least one information field selected from the group consisting of:

a last modification time field, indicating a most recent time of reception of the matching extracted term, during a predetermined period of time, a number of channels containing term, indicating a number of information sources that provided the matching extracted term during a predetermined period of time, a total instances field, indicating a total amount of receptions of the matching extracted term during a predetermined period of time, and a terms inverted entries map, comprising of a plurality of terms inverted file entries, each entry holding information representative of a reception of the matching extracted term from a single information source during a predetermined period of time.

86. The method of claim 85, wherein each inverted file entry comprises at least one field selected from the group consisting of:

a channel identifier, for identifying the information source that provided the matching extracted term during a predetermined period of time, an instances number, for indicating a total amount of receptions of the matching extracted term from an information source during a predetermined period of time, and a time of last appearance, for indicating a most recent time of reception of the matching extracted term from an information source during a predetermined period of time.

87. The method of claim 86, wherein each information packet is further associated to a message terms key map, said message terms key map comprising a plurality of message characteristic entries, each message characteristic entry associated to a matching extracted term being extracted from the information packet, said message characteristic entry comprising at least one field selected from the group consisting of:

a term inverted file, for pointing to the matching extracted term information, an instance of number, for indicating a number of times said matching extracted term appeared in the information packet, and an inverted file entry, for pointing to a terms inverted file entry.

88. The method of claim 78, wherein the step of determining whether to issue an alert is based upon a parameter out of the group consisting of:

a total amounts of extracted terms being received from at least one information source during a predefined time interval;

a number of relevant extracted terms being received from at least one information source during the predefined time interval;

a total number of information sources being searched during the predefined time interval;

an elapsed time since a last appearance of a relevant extracted term from an information source during the predefined time interval;

a position of relevant extracted terms in at least one information source;

extracted term in proximity to a relevant extracted term;

a part of speech of a relevant extracted term; and a relevant extracted term frequency and importance in a language of the information source.

89. The method of claim 78, wherein the step of processing implements a matching technique selected from the group consisting of:

Boolean based matching,
probabilistic matching,
fuzzy matching,
proximity matching, and
vector based matching.

90. The method of claim 78, wherein the step of processing implement complex matching techniques.

91. A method for real time alert, said method comprising the steps of:

receiving an information stream, said information stream either provided by an information source or representative of a portion of a received signal provided by an information source;

determining whether the information stream comprises information packets, and if the information stream is not comprised of information packets, then generating a plurality of information packets from said information stream;

extracting at least one extracted term out of the information packet;

determining whether an extracted term out of said at least one extracted term matches an alert term within an alert criteria, and accordingly updating a matching term information representative of a reception of matching extracted terms;

processing at least a portion of the matching extracted term information to determine whether to issue an alert; and issuing at least one alert to at least one client system, according to said determination, wherein the alert comprises at least one field selected from the group consisting of:
an information source identifier field,
a link field, and
an information source category identification.

92. The method of claim 91, wherein the processing at least a portion of the matching extracted term information is determined by at least one alert criterion.

93. The method of claim 92, wherein the at least one alert criterion comprises at least one alert term that matches the at least one matching extracted term.

94. The method of claim 91, wherein the matching term information representative of a reception of matching extracted terms is undated during a predetermined period of time.

95. The method of claim 91, further comprising the steps of:

storing an information packet and related control data in a storage means; and linking between the stored information packet and the matching extracted term information.

96. The method of claim 91, further comprising deleting the information packet; and deleting the linked extracted term information.

97. The method of claim 91, wherein alert terms are stored in an alert terms hash, alert criteria are stored in an alert criteria map, and the linked matching extracted term information is stored in a terms hash.

98. The method of claim 91, wherein the matching extracted term information is associated to a single matching extracted term comprising at least one information field selected from the group consisting of:

a last modification time field, indicating a most recent time of reception of the matching extracted term, during a predetermined period of time, a number of channels containing term, indicating a number of information sources that provided the matching extracted term during a predetermined period of time, a total instances field, indicating a total amount of receptions of the matching extracted term during a predetermined period of time, and a terms inverted entries map, comprising of a plurality of terms inverted file entries, each entry holding information representative of a reception of the matching extracted term from a single information source during a predetermined period of time.

99. The method of claim 98, wherein each inverted file entry comprises at least one field selected from the group consisting of:

a channel identifier, for identifying the information source that provided the matching extracted term during a predetermined period of time, an instances number, for indicating a total amount of receptions of the matching extracted term from an information source during a predetermined period of time, and a time of last appearance, for indicating a most recent time of reception of the matching extracted term from an information source during a predetermined period of time.

100. The method of claim 99, wherein each information packet is further associated to a message terms key map, said message terms key map comprising a plurality of message characteristic entries, each message characteristic entry associated to a matching extracted term being extracted from the information packet, said message characteristic entry comprising at least one field selected from the group consisting of:

a term inverted file, for pointing to the matching extracted term information, an instance of number, for indicating a number of times said matching extracted term appeared in the information packet, and an inverted file entry, for pointing to a terms inverted file entry.

101. The method of claim 91, wherein the step of determining whether to issue an alert is based upon a parameter out of the group consisting of:

a total amounts of extracted terms being received from at least one information source during a predefined time interval;

a number of relevant extracted terms being received from at least one information source during the predefined time interval;

a total number of information sources being searched during the predefined time interval;

an elapsed time since a last appearance of a relevant extracted term from an information source during the predefined time interval;

a position of relevant extracted terms in at least one information source;

extracted term in proximity to a relevant extracted term;

a part of speech of a relevant extracted term; and a relevant extracted term frequency and importance in a language of the information source.

102. The method of claim 91, wherein the step of processing implements a matching technique selected from the group consisting of:

Boolean based matching, probabilistic matching, fuzzy matching, proximity matching, and vector based matching.

103. The method of claim 91, wherein the step of processing implements complex matching techniques.

104. The method of claim 91, wherein the step of processing further comprises computing a similarity between an alert criteria and information indicating a reception of a group of at least one matching information packet.

105. The method of claim 104, wherein the group of at least one information packet comprises at least one information packet received from a single information source.

106. The system of claim 104, wherein the matching term information representative of a reception of matching extracted terms is updated during a predetermined period of time.

107. A system for real time alert, said system comprising:

an information packet processor for receiving an information packet and extracting at least one extracted term out of the information packet, said information packets either provided by an information source or representative of a portion of a received signal provided by an information source;

a storage means, configured to allow fast insertion and fast deletion of content, for storing matching term information representative of a reception of matching extracted terms;

a storage means controllers coupled to the information packet processor and to the storage means, for receiving the at least one extracted term, for determining whether an extracted term out of said at least one extracted term matches an alert term within an alert criteria, and accordingly for updating the matching term information; and an alert module coupled to the storage means, for processing at least a portion of the matching extracted term information to determine whether to issue an alert, and for issuing at least one alert to at least one client system according to said determination, wherein the alert comprises at least one field selected from the group consisting of:

an information source identifier field, a link field, and an information source category identification.

108. The system of claim 107, wherein the processing at least a portion of the matching extracted term information is determined by at least one alert criterion.

109. The system of claim 108, wherein the at least one alert criterion comprises at least one alert term that matches the at least one matching extracted term.

110. The system of claim 107, the storage means controller further adapted to store the information packet and related control data in the storage means, and to link between the stored information packet and the matching extracted term information.

111. The system of claim 107, wherein the storage means holds a term index data structure.

112. The system of claim 107, wherein the information packet processor is further adapted to perform at least one preprocessing step selected from the group consisting of: adding control data to said information packet, filtering the information packet, processing an extracted term by adding control information to said extracted term, and filtering the extracted term, wherein said filtered extracted terms are matched against alert terms.

113. The system of claim 107, wherein the information packet processor is configured to extract an extracted term from an information packet by parsing and stemming the information packet.

114. The system of claim 107, wherein the storage means controller is adapted to delete information packets from the storage means, after a predetermined period has lapsed; and wherein a deletion of an information packet is followed by a deletion of the linked extracted term information.

115. The system of claim 107, wherein alert terms and matching terms information are stored in an alert terms hash, alert criteria are stored in an alert criteria map, and wherein the linked information packets are stored in a message hash.

116. The system of claim 107, wherein the matching extracted term information comprises at least one information field selected from the group consisting of:
- a last modification time field, indicating a most recent time of reception of the matching extracted term, during a predetermined period of time,
- a number of channels containing term, indicating a number of information sources that provided the matching extracted term during a predetermined period of time,
- a total instances field, indicating a total amount of receptions of the matching extracted term during a predetermined period of time, and
- a terms inverted entries map, comprising a plurality of matching terms inverted file entries, each entry holding information representative of a reception of the matching extracted term from a single information source during a predetermined period of time.

117. The system of claim 116, wherein each matching term inverted file entry comprises at least one field selected from the group consisting of:
- a channel identifier, for identifying the information source that provided the matching extracted term during a predetermined period of time,
- an instances number, for indicating a total amount of receptions of the matching extracted term from an information source during a predetermined period of time, and
- a time of last appearance, for indicating a most recent time of reception of the matching extracted term from an information source during a predetermined period of time.

118. The system of claim 117, wherein each information packet is further associated to a message terms key map, said message terms key map comprising of a plurality of message characteristic entries, each message characteristic entry associated to a matching extracted term being extracted from the information packet, said message characteristic entry comprising at least one field selected from the group consisting of:
- a term inverted file, for pointing to the matching extracted term information,
- an instance of number, for indicating a number of times said matching extracted term appeared in the information packet, and
- an inverted file entry, for pointing to a terms inverted file entry.

119. The system of claim 118, wherein the storage means controller is further adapted to determine a deletion of an information packet and associated matching extracted term information.

120. The system of claim 107, wherein the storage means controller is adapted to access the message hash table, to obtain relevant entries of said matching extracted terms belonging to said information packet; and to access said matching extracted terms inverted file for each said matching extracted terms entry pointed to by said matching extracted terms inverted file.

121. The system of claim 107, wherein the alert module is adapted to rank information sources according to a similarity between at least a portion of information packets provided by said information sources and between an alert criteria.

122. The system of claim 107, wherein the said rank is based upon a parameter selected from the group consisting of:
- a total amount of extracted terms provided by an information source in a predefined time interval,
- an elapsed time since the extracted term was provided by the information source in said predefined time interval, and
- an extracted term position in the information source.

123. The system of claim 107, wherein the information source is selected from the group consisting of: data network providers, chat channels providers, news providers, and music providers.

124. The system of claim 107, wherein information packets comprise content selected from the group consisting of: text, audio, video, multimedia, and executable code streaming media.

125. The system of claim 107, further adapted to compute a similarity between an alert criteria and information indicating a reception of a group of at least one matching information packet.

126. The system of claim 125, wherein the group of at least one information packet comprises at least one information packet received from a single information source.

127. The system of claim 126, wherein the similarity reflects at least one of the parameters selected from the group consisting of:
- a total amounts of extracted terms being received from at least one information source during a predefined time interval;
- a number of matching extracted terms being received from at least one information source during the predefined time interval;
- a total number of information sources being searched during the predefined time interval;
- an elapsed time since a last appearance of a matching extracted term from an information source during the predefined time interval;
- a position of matching extracted terms in at least one information source;
- an extracted term in proximity to a matching extracted term;
- a part of speech of a matching extracted term; and
- a matching extracted term frequency and importance in a language of the information source.

128. The system of claim 107, wherein the alert module is further adapted to implement a matching technique selected from the group consisting of:
- Boolean based matching,
- probabilistic matching,
- fuzzy matching,
- proximity matching, and
- vector based matching.

129. The system of claim 107, wherein the alert module is further adapted to implement complex matching techniques.

130. The system of claim 107, wherein the alert module is further adapted to determine to which client system to send an alert.

131. The system of claim 107, wherein the alert module is further adapted to determine a format of an alert to be sent to a client system, according to a predefined client system format, and to format the alert according to said client system format.

132. The system of claim 131, wherein said predetermined client format is selected from the group consisting of:
HTML format,
WAP format,
PDA compatible format,
Digital television compatible format,
electronic mail format, and
multimedia stream format.

133. The system of claim 107, wherein the link field allows the at least one client system to receive additional information selected from the group consisting of:
a multimedia stream originated by said information source,
a stream of information packets originated by said information source,
a multimedia stream associated to the information packet from which the extracted term was extracted, and
a stream of information packets, comprising the extracted term.

134. The system of claim 133, wherein the client system is configured to generate a unique information source category indication in response to a reception of said information source category identification.

135. The system of claim 107, wherein the client system is configured to and to generate a unique information source indication in response to a reception of said information source identification.

136. The system of claim 107, wherein the information packet processor comprises at least one module selected from a group of modules consisting of:
a message coordinator module adapted to coordinate an handling of a plurality of information packets;
a message filter module for filtering the plurality of information packets according to predefined rules;
a term extractor module for performing parsing and stemming on said plurality of information packets; and
a terms filter for excluding extracted terms according to predefined rules.

137. The system of claim 107, wherein the storage means holds a term index data structure, said term index data structure further comprising:
an alert terms hash table to hold alert terms;
a matching extracted terms inverted file pointed to by said alert term hash table holding a matching extracted terms inverted entry map;
a messages hash table to hold information packets identification;
a messages data table to hold information packets data; and
a channel map to hold a list of information sources and the related number of index terms of said information source.

138. The system of claim 137, wherein the terms inverted file further comprises:
a matching extracted terms inverted entries map table;
a total instances of said matching extracted term;
a number of information sources containing said matching extracted term; and
a last modification time of said matching extracted term.

139. The system of claim 138, further comprising:
a message terms keyed map;
an information source identification; and
an information packet time of arrival.

140. The system of claim 139, wherein the message terms keyed map further comprises:
a pointer to said matching extracted terms inverted file;
an instances number of said matching extracted term in said information packet; and
a pointer to said inverted file entry related to said matching extracted term.

141. The system of claim 140, wherein the matching extracted terms inverted entries map further comprises:
an information source identification;
an instances number of said matching extracted term in said information source informational content; and
a time of last appearance of said matching extracted term in said information source informational content.

142. The system of claim 107, wherein the storage means further allows timely deletions of irrelevant or time-decayed terms and query-terms.

143. The system of claim 107, further comprising an alert criteria module coupled to the storage means to the storage means controller, and to a plurality of client systems for handling client system requests for updating alert criteria.

144. The system of claim 143, wherein the alert criteria module comprises at least one module selected from the group consisting of:
an alert criteria coordinator module to coordinate the processing of alert criteria,
an alert term extractor to parse and stem incoming alert criteria in order to extract and process operative alert terms, and
an alert terms filter for excluding specific alert terms in a predefined manner.

145. A system for real time alert, said system comprising:
an information packet processor for receiving an information packet and extracting at least one extracted term out of the information packet, said information packets either provided by an information source or representative of a portion of a received signal provided by an information source;
a storage means for storing matching term information representative of a reception of matching extracted terms;
a storage means controller coupled to the information packet processor and to the storage means, for receiving the at least one extracted term, for determining whether an extracted term out of said at least one extracted term matches an alert term within an alert criteria, and accordingly for updating the matching term information; and
an alert module coupled to the storage means, for processing at least a portion of the matching extracted term information to determine whether to issue an alert, and for issuing at least one alert to at least one client system according to said determination,
wherein the alert comprises at least one field selected from the group consisting of:
an information source identifier field,
a link field, and
an information source category identification.

146. The system of claim 145, wherein the processing at least a portion of the matching extracted term information is determined by at least one alert criterion.

147. The system of claim 145, wherein the at least one alert criterion comprises at least one alert term that matches the at least one matching extracted term.

148. The system of claim 145, wherein the matching term information representative of a reception of matching extracted terms is updated during a predetermined period of time.

149. The system of claim 145, further comprising an information interface coupled to the information packet processor, said information interface adapted to receive information streams and to provide information packets to the information packet processor.

150. The system of claim 145, wherein the information interface is further coupled to the storage means controller, for allowing a storage of said information packets in the storage means.

* * * * *